(12) United States Patent
Ohshima et al.

(10) Patent No.: US 8,542,511 B2
(45) Date of Patent: Sep. 24, 2013

(54) SINGLE-PHASE VOLTAGE SOURCE AC/DC CONVERTER AND INTERCONNECTION SYSTEM

(75) Inventors: Masaaki Ohshima, Tokyo (JP); Shuichi Ushiki, Tokyo (JP); Jinbin Zhao, Tokyo (JP)

(73) Assignee: Origin Electric Company, Limited, Toshima-ku, Tokyo (JP)

( * ) Notice: Subject to any disclaimer, the term of this patent is extended or adjusted under 35 U.S.C. 154(b) by 93 days.

(21) Appl. No.: 13/330,222

(22) Filed: Dec. 19, 2011

(65) Prior Publication Data
US 2012/0161513 A1   Jun. 28, 2012

(30) Foreign Application Priority Data

Dec. 28, 2010   (JP) ................... 2010-293036

(51) Int. Cl.
*H02M 7/04* (2006.01)
*H02M 7/68* (2006.01)
*H02M 5/42* (2006.01)

(52) U.S. Cl.
USPC ............. 363/84; 363/44; 363/86; 363/89; 363/90; 363/125; 363/127

(58) Field of Classification Search
USPC ............. 363/44, 84, 86, 89, 90, 125, 127
See application file for complete search history.

(56) References Cited

U.S. PATENT DOCUMENTS

| | | | | |
|---|---|---|---|---|
| 4,934,822 A | * | 6/1990 | Higaki | 363/37 |
| 6,330,170 B1 | * | 12/2001 | Wang et al. | 363/37 |
| 7,035,123 B2 | * | 4/2006 | Schreiber et al. | 363/37 |
| 7,372,709 B2 | * | 5/2008 | Mazumder et al. | 363/16 |
| 7,768,800 B2 | * | 8/2010 | Mazumder et al. | 363/17 |
| 2007/0047612 A1 | * | 3/2007 | Keough | 373/52 |
| 2010/0027304 A1 | * | 2/2010 | Wang et al. | 363/126 |

FOREIGN PATENT DOCUMENTS

| | | |
|---|---|---|
| JP | 2009-201224 | 9/2009 |
| JP | 2009-219263 | 9/2009 |
| JP | 2009-247162 | 10/2009 |
| JP | 2009-290993 | 12/2009 |

OTHER PUBLICATIONS

Ohshima, et al., "A Novel Utility-Interactive Electrical Energy Storage System Making Use of Electrical Double-Layer Capacitors and an Error Tracking Mode PWM Converter", Electrical Engineering in Japan, vol. 133, No. 2, 2000, p. 52-61.

* cited by examiner

*Primary Examiner* — Bao Q Vu
(74) *Attorney, Agent, or Firm* — Ohlandt, Greeley, Ruggiero & Perle, L.L.P.

(57) ABSTRACT

A single-phase voltage source AC/DC converter according to the present invention generates a second axis voltage command from difference between a DC voltage detection value at a DC terminal and a DC voltage command value and controls a DC voltage by increasing and decreasing active power with the second axis voltage command. For example, the voltage at the DC terminal is increased by decreasing active power when the DC voltage detection value at the DC terminal is lower than the DC voltage command, while the DC voltage detection value at the DC terminal is decreased by increasing the active power when the DC voltage detection value at the DC terminal is higher than the DC voltage command.

9 Claims, 20 Drawing Sheets

PCC: INTERCONNECTION POINT

SINGLE-PHASE VOLTAGE SOURCE AC/DC CONVERTER AND INTERCONNECTION SYSTEM

BACKGROUND OF THE INVENTION

1. Field of the Invention

The present invention relates to a single-phase voltage source AC/DC converter capable of being applied to an interconnection device or an uninterruptible power source device being a power source of a power system and an interconnection system including the converter.

2. Description of the Related Art

There has been known a single-phase voltage source AC/DC converter capable of supplying power as converting a direct current to an alternating current by automatically adjusting a voltage, a frequency and a phase to those of a power system which is to be connected with (for example, see Japanese Patent Application Laid-Open No. 2009-219263).

SUMMARY OF THE INVENTION

A single-phase voltage source AC/DC converter of Japanese Patent Application Laid-Open No. 2009-219263 operates such that power supplied from a DC side is converted to an alternating current and is output to a system as active power while power supplied from an AC side is converted to a direct current and is output to the DC side as active power.

Here, it is required that a constant DC voltage is input to the single-phase voltage source AC/DC converter of Japanese Patent Application Laid-Open No. 2009-219263.

Here, in a case that a DC device output DC voltage of which fluctuates like recently-popularized solar power generation is directly connected to the single-phase voltage source AC/DC converter of Japanese Patent Application Laid-Open No. 2009-219263, it becomes difficult to control AC output (i.e., a voltage, a frequency and a phase) when the DC voltage is decreased by a predetermined amount or more.

Meanwhile, there has been known an inverter capable of converting a direct current to an alternating current by controlling a fluctuating DC voltage (for example, see "A Novel Utility-Interactive Electrical Energy Storage System Making Use of Electrical Double-Layer Capacitors and an Error Tracking Mode PWM Converter", (The Institute of Electrical Engineers of Japan, Industry Applications, Transactions, 118-12, December 1998)). FIG. 1 is a view illustrating an inverter described in "A Novel Utility-Interactive Electrical Energy Storage System Making Use of Electrical Double-Layer Capacitors and an Error Tracking Mode PWM Converter", (The Institute of Electrical Engineers of Japan, Industry Applications, Transactions, 118-12, December 1998). FIG. 2 is a view illustrating details of an automatic voltage regulator (dc-AVR) in FIG. 1. A DC voltage command value $V_D^*$ being a target value of a DC terminal voltage is set at the inverter in FIG. 1. The automatic voltage regulator inputs a signal of difference between the DC voltage command value $V_D^*$ and a DC voltage detection value $V_D$ at the DC terminal to an amplifier having low pass characteristics. The automatic voltage regulator adds a DC current value at the DC terminal to the output of the amplifier (i.e., feedforward). Then, the automatic voltage regulator obtains a PWM command j(t) as multiplying a signal obtained in a feedforward manner by a reference sine wave signal (i.e., a PCC voltage) which is systematically synchronized. The automatic voltage regulator generates a gate signal based on the PWM signal j(t).

Here, since the difference between the detected DC voltage and the specified value is provided in a feedforward manner as the PWM command, the inverter of "A Novel Utility-Interactive Electrical Energy Storage System Making Use of Electrical Double-Layer Capacitors and an Error Tracking Mode PWM Converter" (The Institute of Electrical Engineers of Japan, Industry Applications, Transactions, 118-12, December 1998) can not perform autonomous parallel operation.

As described above, the single-phase voltage source AC/DC converter of Japanese Patent Application Laid-Open No. 2009-219263 has a problem with inputting of a fluctuating DC voltage and the inverter of "A Novel Utility-Interactive Electrical Energy Storage System Making Use of Electrical Double-Layer Capacitors and an Error Tracking Mode PWM Converter" (The Institute of Electrical Engineers of Japan, Industry Applications, Transactions, 118-12, December 1998) has a problem of incapability of autonomous parallel operation.

To address the above issues, the present invention provides a single-phase voltage source AC/DC converter capable of freely controlling reactive power and performing autonomous parallel operation while being capable of supporting DC voltage fluctuation and an interconnection system utilizing the single-phase voltage source AC/DC converter.

In view of the above, the single-phase voltage source AC/DC converter according to the present invention controls a DC voltage by increasing and decreasing active power as generating a first axis command from difference between a measured reactive power value and a set reactive power command value and generating a second axis voltage command from difference between the detected DC voltage and the set DC voltage command.

Specifically, a single-phase voltage source AC/DC converter according to the present invention includes a single-phase voltage source AC/DC converting circuit, which has internal equivalent impedance as seen from an AC terminal, for converting power from a DC voltage source connected to a DC terminal to single-phase AC power to output from the AC terminal or for converting single-phase AC power from a single-phase AC source connected to the AC terminal to DC power to output from the DC terminal in accordance with a pulse width of a gate signal generated based on a PWM command; a phase difference generating circuit, which has a phase delay single-phase AC generator for delaying a phase of a single-phase AC output voltage at the AC terminal and generating a delay single-phase alternating voltage, for generating a phase difference voltage corresponding to phase difference between the single-phase AC output voltage at the AC terminal and an internal electromotive voltage of the single-phase voltage source AC/DC converting circuit based on the delay single-phase alternating voltage; a superior voltage control circuit to which a first axis voltage command for amplitude of the single-phase AC output voltage at the AC terminal and a second axis voltage command for a single-phase AC frequency at the AC terminal are input for outputting a voltage command signal generated so that the amplitude of the single-phase AC output voltage at the AC terminal approaches the first axis voltage command and a frequency command signal generated so that the single-phase AC frequency at the AC terminal approaches the second axis voltage command based on the first axis voltage command, the second axis voltage command, the phase difference voltage from the phase difference generating circuit and the single-phase AC output voltage at the AC terminal; a frequency control circuit for determining an electrical angle of the internal electromotive voltage of the single-phase voltage source AC/DC converting circuit to generate a generated electrical angle based on a reference frequency of a single-phase AC output frequency at the AC terminal, the frequency command signal from the superior voltage control circuit, and an output signal from the phase difference generating circuit; a subordinate voltage control circuit for outputting a signal generated so that the amplitude, the frequency, and the phase of the single-phase AC output voltage approach a synthesized value of a reference voltage of the single-phase AC output voltage at the AC terminal, the voltage command signal, and the generated electrical angle as the PWM command based on the single-phase AC output voltage at the AC terminal, the generated electrical angle of the frequency control circuit, and the voltage command signal from the superior voltage control circuit; and a command value arithmetic circuit to which a DC voltage command value to specify a voltage at the DC terminal is set and which obtains the second axis voltage command by detecting a DC voltage detection value being the voltage at the DC terminal and calculating difference between the DC voltage command value and the DC voltage detection value.

The single-phase voltage source AC/DC converter according to the present invention generates a second axis voltage command from difference between a DC voltage detection value at a DC terminal and a DC voltage command value and controls a DC voltage by increasing and decreasing active power with the second axis voltage command. For example, the voltage at the DC terminal is increased by decreasing active power when the DC voltage detection value at the DC terminal is lower than the DC voltage command, while the DC voltage detection value at the DC terminal is decreased by increasing the active power when the DC voltage detection value at the DC terminal is higher than the DC voltage command.

A single-phase voltage source AC/DC converter is provided with two command values being a first axis voltage command $V_1^*$ and a second axis voltage command $V_2^*$. In a case of active power reactive power control (i.e., PQ control) of Japanese Patent Application Laid-Open No. 2009-219263, an output signal of active control (i.e., P control) is a second axis voltage command and an output signal of reactive control (i.e., Q control) is a first axis voltage command.

In the single-phase voltage source AC/DC converter according to the present invention, an output signal of DC voltage control is the second axis voltage command $V_2^*$ and an output signal of the reactive power control (i.e., Q control) is the first axis voltage command $V_1^*$ as illustrated in FIG. 3, and then, the DC voltage and the reactive power are concurrently controlled.

Accordingly, the present invention provides a single-phase voltage source AC/DC converter capable of freely controlling reactive power and performing autonomous parallel operation while being capable of supporting DC voltage fluctuation.

The command value arithmetic circuit of the single-phase voltage source AC/DC converter according to the present invention calculates the difference between the DC voltage command value and the DC voltage detection value with a low pass characteristic circuit.

Here, the low pass characteristic circuit of the command value arithmetic circuit has characteristics of Equation 1.

[Equation 1]

$$\hat{V}_2^*(s) = -\frac{K_{dc}}{1+T_{Kdc}\cdot s}\left(\hat{V}_D^*(s)-\hat{V}_D(s)\right) \quad (1)$$

where, $V_2^*$ represents a second axis voltage command;

$V_D^*$ represents a DC voltage command value;

$V_D$ represents a DC voltage detection value;

s represents a variable of laplace transform;

$K_{dc}$ represents a proportional gain;

$T_{Kdc}$ represents a first-order lag time constant; and

^ represents a laplace transform.

The command value arithmetic circuit of the single-phase voltage source AC/DC converter generates the second axis voltage command of the single-phase voltage source AC/DC converting circuit by performing amplifying after cutting a high frequency component of the difference between the DC voltage detection value and the DC voltage command value with the low pass character circuit. Here, even in a case that a high frequency component is not cut with the low pass character circuit as the first-order lag time constant $T_{Kdc}$ being zero, the command value arithmetic circuit can generate the second axis voltage command. The command value arithmetic circuit has a better transient response than a command value arithmetic circuit utilizing a later-mentioned integrating circuit.

The command value arithmetic circuit of the single-phase voltage source AC/DC converter according to the present invention calculates the difference between the DC voltage command value and the DC voltage detection value with an integrating circuit.

The integrating circuit of the command value arithmetic circuit has characteristics of Equation 2.

[Equation 2]

$$\hat{V}_2^*(s) = -\frac{1}{T_{dc}\cdot s}\left(\hat{V}_D^*(s)-\hat{V}_D(s)\right) \quad (2)$$

where, $V_2^*$ represents a second axis voltage command;

$V_D^*$ represents a DC voltage command value;

$V_D$ represents a DC voltage detection value;

s represents a variable of laplace transform;

$T_{dc}$ represents a integral time constant; and

^ represents a laplace transform.

The command value arithmetic circuit of the single-phase voltage source AC/DC converter generates the second axis voltage command of the single-phase voltage source AC/DC converting circuit by integrating the difference between the DC voltage detection value and the DC voltage command value. The command value arithmetic circuit has a smaller DC voltage deviation at a steady state than the command value arithmetic circuit utilizing the low pass characteristic circuit described above.

The command value arithmetic circuit of the single-phase voltage source AC/DC converter according to the present invention calculates the difference between the DC voltage command value and the DC voltage detection value with a parallel circuit in which a low pass characteristic circuit and an integrating circuit are parallely-arranged.

The parallel circuit of the command value arithmetic circuit has characteristics of Equation 3.

[Equation 3]

$$\hat{V}_2^*(s) = \left( -\frac{K_{dc}}{1+T_{Kdc}\cdot s} - \frac{1}{T_{dc}\cdot s} \right)\left( \hat{V}_D^*(s) - \hat{V}_D(s) \right) \quad (3)$$

where,
$V_2^*$ represents a second axis voltage command;
$V_D^*$ represents a DC voltage command value;
$V_D$ represents a DC voltage detection value;
s represents a variable of laplace transform;
$K_{dc}$ represents a proportional gain;
$T_{Kdc}$ represents a first-order lag time constant;
$T_{dc}$ represents a integral time constant; and
$\hat{}$ represents a laplace transform.

Since the low pass characteristic circuit and the integrating circuit are parallely-arranged, the command value arithmetic circuit satisfies both of the transient response and the steady deviation.

The single-phase voltage source AC/DC converter according to the present invention further includes a DC current detecting circuit for detecting a DC current value at the DC terminal and the command value arithmetic circuit adds the DC current value detected by the DC current detecting circuit when calculating the difference between the DC voltage command value and the DC voltage detection value. The single-phase voltage source AC/DC converter according to the present invention can converge the voltage at the DC terminal rapidly to the DC voltage command value by forwardly feeding the DC current value.

Further, an interconnection system according to the present invention includes the single-phase voltage source AC/DC converter and n (n is any positive integer) sets of DC devices which are connected to the DC terminal of the single-phase voltage source AC/DC converter via a DC/DC converters so that DC power is transmitted to and received from the DC terminal.

The single-phase voltage source AC/DC converter is capable of performing autonomous parallel operation and controlling the DC voltage at a desired value. Accordingly, in the interconnection system, a DC energy source of which output voltage varies and a load can be connected to the DC terminal via the DC/DC converter while a power system is connected to the AC terminal.

Accordingly, the present invention can provide the interconnection system utilizing the single-phase voltage source AC/DC converter.

The present invention can provide a single-phase voltage source AC/DC converter capable of freely controlling reactive power and performing autonomous parallel operation while being capable of supporting DC voltage fluctuation and an interconnection system utilizing the single-phase voltage source AC/DC converter.

DESCRIPTION OF THE PREFERRED EMBODIMENTS

Figure 1:
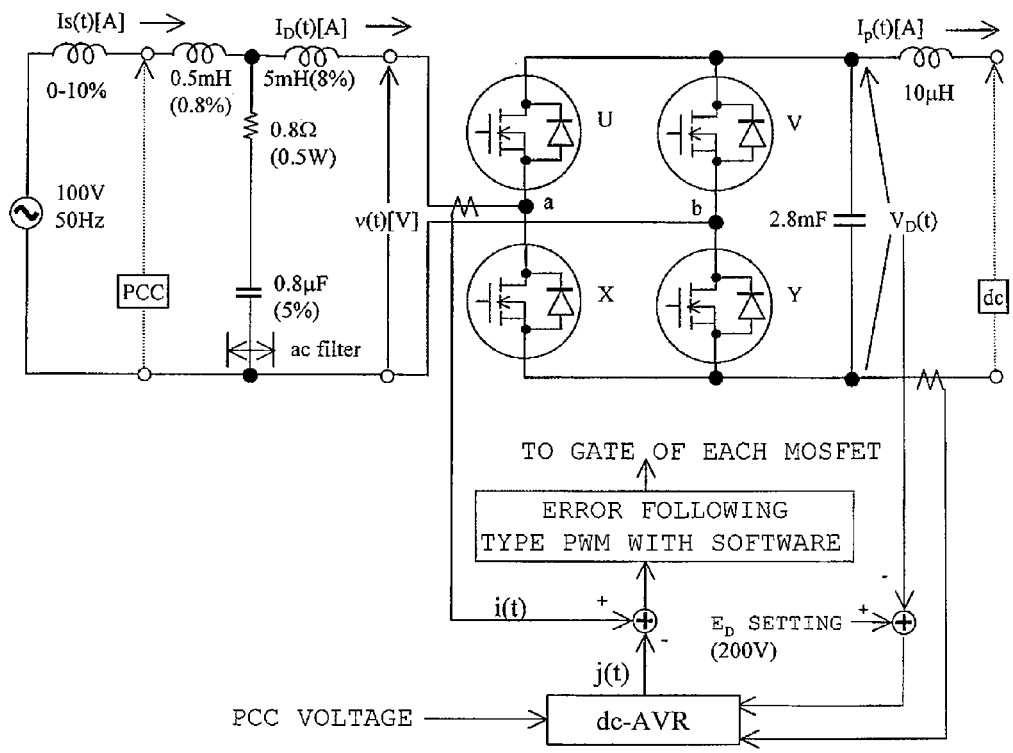
FIG. 1 is a view illustrating a traditional inverter.
Figure 2:
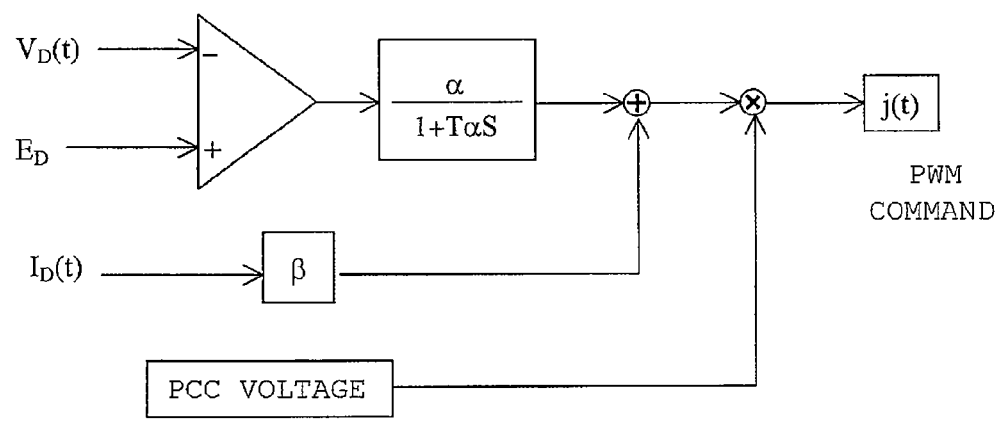
FIG. 2 is a view illustrating details of an automatic voltage regulator (dc-AVR)

Embodiments of the present invention are described with reference to the attached drawings. The embodiments hereinafter described are examples of the present invention, and the present invention is not limited to the following embodiments. Meanwhile, components to which an identical reference numeral is assigned in this description and the drawings are identical to each other.

[Single-Phase Voltage Source AC/DC Converter]

Figure 11:
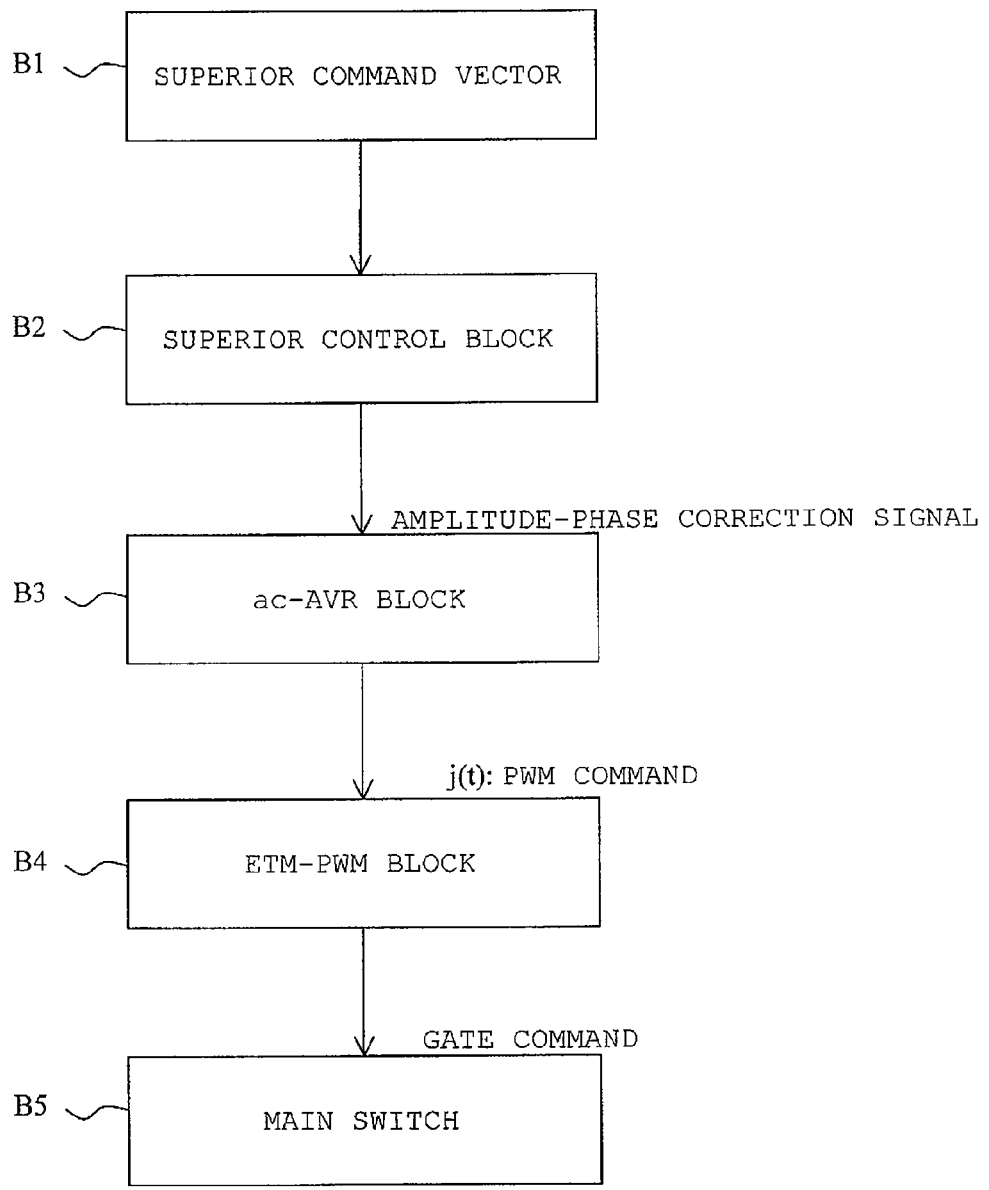
FIG. 11 is a view illustrating connection relation of a control block in a single-phase voltage source AC/DC converter according to the present invention.

FIG. 11 is a view exemplifying connection relation of a control block in a single-phase voltage source AC/DC converter and includes a superior command vector B1, a superior control block B2, an ac-AVR block B3, an ETM-PWM block B4, and a main switch B5. Regarding the ac-AVR block B3, a transformer connected to an output circuit of an inverter is prevented from anhysteretic magnetization by adopting a single-phase ac-AVR having internal equivalent impedance described in Japanese Patent Application Laid-Open No. 2009-201224 as a main part of inductance. In addition, since the internal equivalent impedance can be actualized as a parallel circuit of a resistance component and an inductance component, degree of freedom of design is increased.

Figure 4:
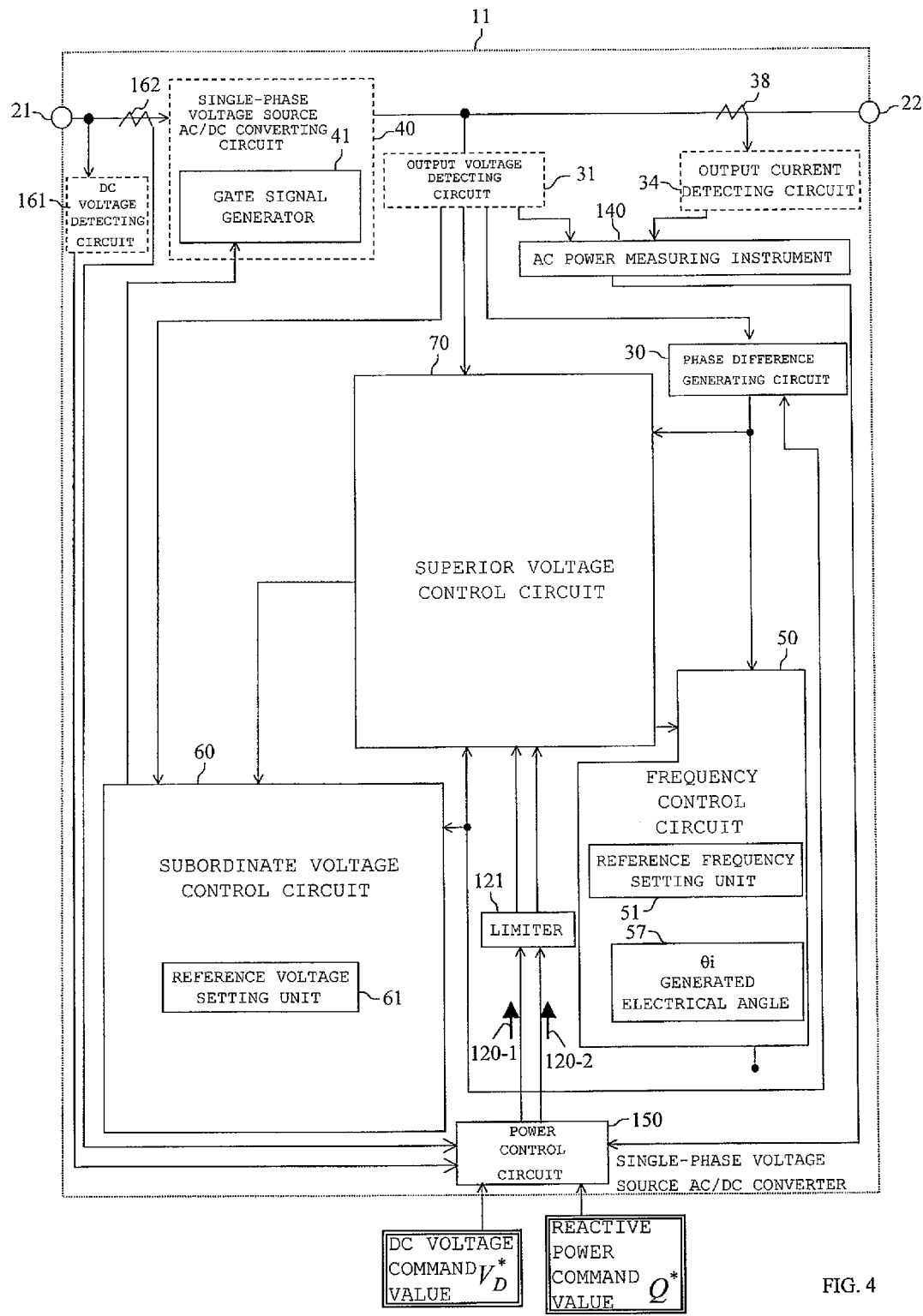
FIG. 4 is a schematic configuration diagram of a single-phase voltage source AC/DC converter according to the present invention.
Figure 5:
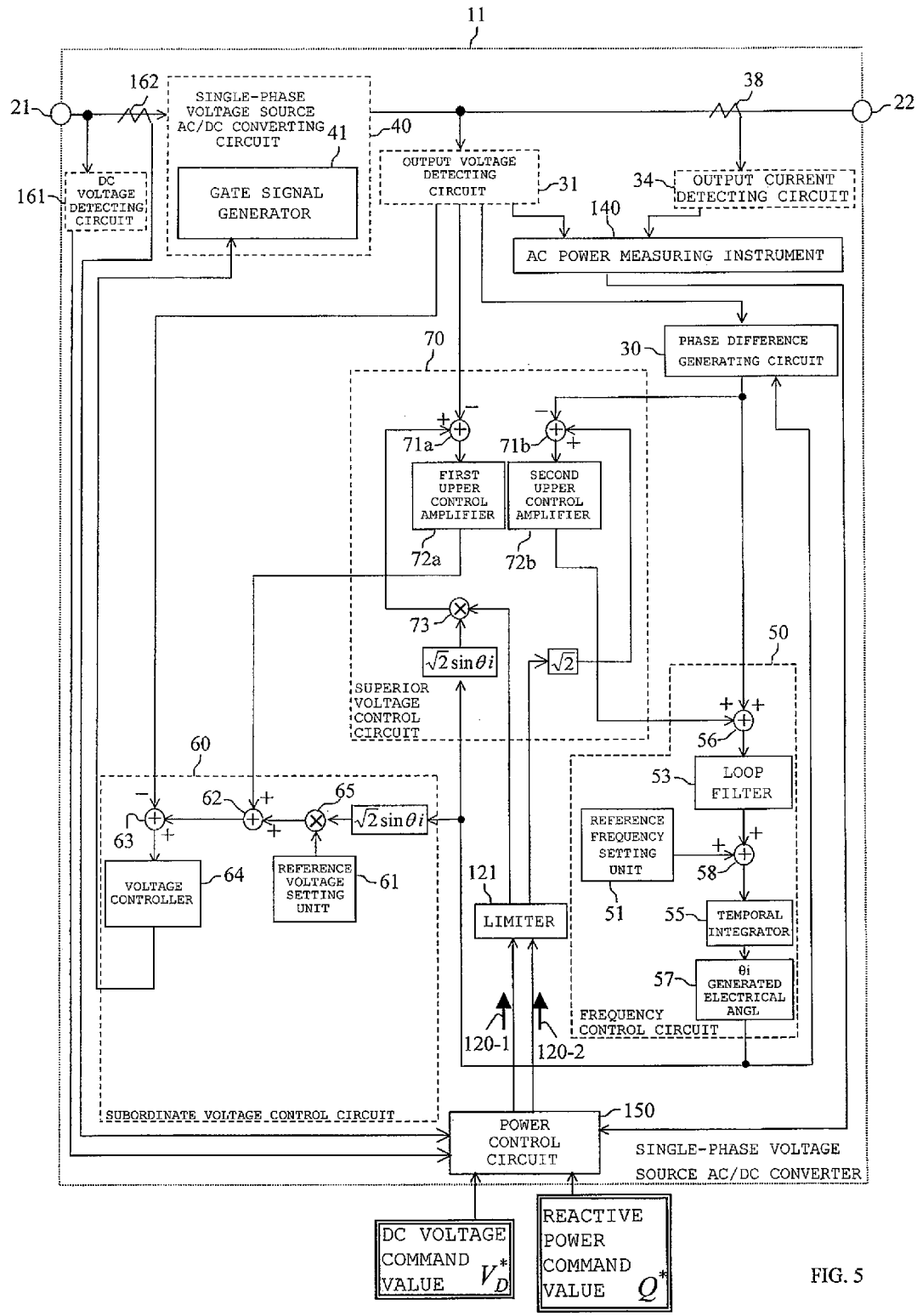
FIG. 5 is a schematic configuration diagram of a single-phase voltage source AC/DC converter according to the present invention.

A schematic configuration of a single-phase voltage source AC/DC converter according to the present embodiment is illustrated in FIGS. 4 and 5. Then, details of the respective blocks illustrated in FIG. 11 are described.

A single-phase voltage source AC/DC converter 11 illustrated in FIG. 4 includes a single-phase voltage source AC/DC converting circuit 40 having internal equivalent impedance as seen from an AC terminal 22 for receiving power at a DC terminal 21 from a DC voltage source (not illustrated) and converting to single-phase AC power in accordance with a pulse width of a gate signal generated based on a PWM command to output from the AC terminal 22; a phase difference generating circuit 30 having a phase delay single-phase AC generator to generate a delay single-phase alternating voltage of which phase is delayed against a single-phase AC output voltage at the AC terminal 22 for generating a phase difference voltage corresponding to phase difference between the single-phase AC output voltage at the AC terminal 22 and an internal electromotive voltage of the single-phase voltage source AC/DC converting circuit 40 based on the delay single-phase alternating voltage;

a power control circuit 150 which outputs a first axis voltage command value 120-1 to control amplitude of the single-phase output voltage at the AC terminal 22 and a second axis voltage command value 120-2 to control a frequency of the single-phase output voltage at the AC terminal 22 so that a DC voltage at the DC terminal 21 approaches a DC voltage command value and a reactive power value of the single-phase output power at the AC terminal 22 approaches a reactive power command value based on the DC voltage command value specifying a voltage at the DC terminal 21, the reactive power command value against the reactive power value of the single-phase output power at the AC terminal 22, a DC voltage detection value obtained by detecting a voltage at the DC terminal 21, and a reactive power measurement value of the single-phase output power at the AC terminal 22;

a superior voltage control circuit 70 which outputs a voltage command signal and a frequency command signal generated so that the amplitude and the frequency of the single-phase AC output voltage at the AC terminal 22 respectively approach the first axis voltage command value 120-1 and the second axis voltage command value 120-2 based on the first axis voltage command value 120-1 and the second axis voltage command value 120-2 from the power control circuit 150, the phase difference voltage from the phase difference generating circuit 30, and the single-phase AC output at the AC terminal 22;

a frequency control circuit 50 which generates a generated electrical angle based on a reference frequency of a single-phase AC output frequency at the AC terminal 22, the frequency command signal from the superior voltage control circuit 70, and the phase difference voltage from the phase difference generating circuit 30 and which synchronizes an electrical angle of an internal electromotive voltage of the single-phase source AC/DC converting circuit 40 with the generated electrical angle; and a subordinate voltage control circuit 60 which outputs a signal generated so that the amplitude, the frequency, and the phase of the single-phase output voltage approach a synthesized value of the reference voltage of the single-phase AC output voltage at the AC terminal 22, the voltage command value and the generated value as the PWM command based on the single-phase AC output voltage at the AC terminal 22, the generated value from the frequency control circuit 50, and the voltage command signal from the superior voltage control circuit 70.

The first axis voltage command value 120-1 and the second axis voltage command value 120-2 correspond to the superior command vector B1 in FIG. 11. The superior voltage control circuit 70 corresponds to the superior control block B2 in FIG. 11. The subordinate voltage control circuit 60 and the frequency control circuit 50 correspond to the ac-AVR block B3 in FIG. 11. A gate signal generator 41 corresponds to the ETM-PWM block B4 in FIG. 11. A single-phase voltage source AC/DC converting unit included in the single-phase voltage source AC/DC converting circuit 40 corresponds to the main switch B5 in FIG. 11.

The single-phase voltage source AC/DC converting circuit 40 converts power from the DC voltage source (not illustrated) to single-phase AC power in accordance with the pulse width of the gate signal generated by the gate signal generator 41 based on the PWM command. Examples of the DC voltage source include a voltage source such as a battery to output a DC voltage independently, a voltage source to output a DC voltage as rectifying after generating power with a power generating method such as power generation by wind, and a voltage source to output a DC voltage by controlling a voltage of a DC capacitor. Here, it is also possible that a blocking inductor is further provided between a connection point of an output voltage detecting circuit 31 and the AC terminal 22 and each single-phase AC output voltage is output from the AC terminal 22 through the blocking inductor. In this case, it is possible to prevent outflow of a PWM component to the AC terminal 22 at the single-phase voltage source AC/DC converting circuit 40.

Figure 7:
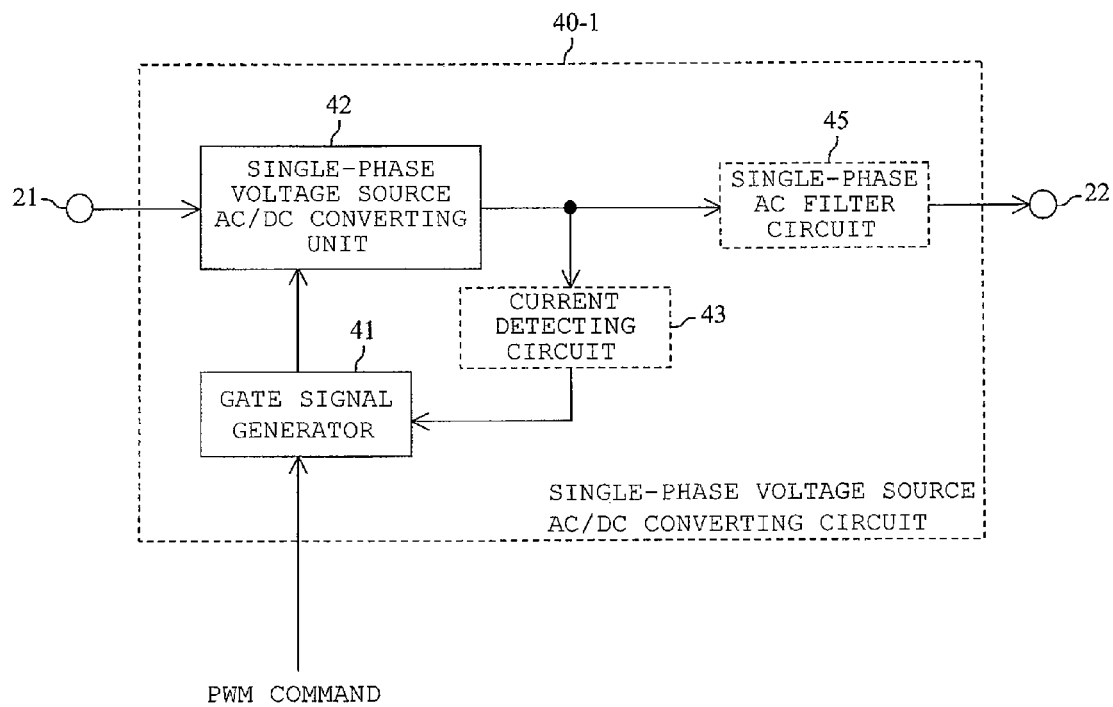
FIG. 7 is a schematic configuration diagram of a single-phase voltage source AC/DC converting circuit included in a single-phase voltage source AC/DC converter according to the present invention.
Figure 8:
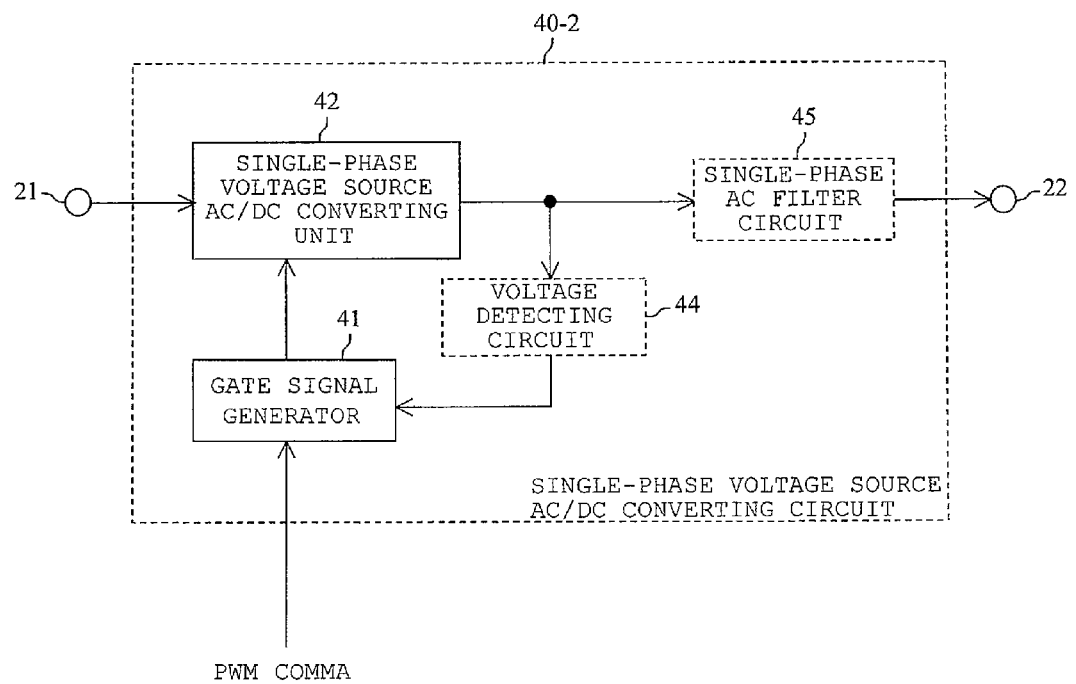
FIG. 8 is a schematic configuration diagram of a single-phase voltage source AC/DC converting circuit included in a single-phase voltage source AC/DC converter according to the present invention.

Schematic configuration diagrams of the single-phase voltage source AC/DC converting circuit are illustrated in FIGS. 7 and 8.

A single-phase voltage source AC/DC converting circuit 40-1 illustrated in FIG. 7 includes a single-phase voltage source AC/DC converting unit 42 having internal equivalent impedance as seen from the AC terminal 22 to receive power from the DC voltage source at the DC terminal 21 in accordance with the pulse width of the gate signal and to output after converting to single-phase AC power, a current detecting circuit 43 which detects a single-phase AC output current of the single-phase voltage source AC/DC converting unit 42 and outputs a signal generated corresponding to magnitude of the single-phase AC output current, the gate signal generator 41 which generates and outputs the gate signal so that difference between the PWM command and the output from the current detecting circuit 43 approaches zero, and a single-phase AC filter circuit 45 which outputs as removing a high frequency component caused by the gate signal at the single-phase voltage source AC/DC converting unit 42 from the single-phase AC output voltage of the single-phase voltage source AC/DC converting unit 42.

Further, instead of the current detecting circuit 43 in FIG. 7, a single-phase voltage source AC/DC converting circuit 40-2 illustrated in FIG. 8 includes a voltage detecting circuit 44 which detects a single-phase AC output voltage of the single-phase voltage source AC/DC converting unit 42 and outputs a signal generated corresponding to magnitude of the single-phase AC output voltage. In this case, the gate signal generator 41 generates and outputs the gate signal so that difference between the PWM command and the output from the voltage detecting circuit 44 approaches zero.

The internal equivalent impedance included in the single-phase voltage source AC/DC converting unit 42 illustrated in FIGS. 7 and 8 can be added by control variables in the single-phase voltage source AC/DC converter 11 in FIG. 4 or by connecting a resistance, a reactor, a single-phase transformer or a combination thereof to the output of the single-phase voltage source AC/DC converting circuit 40-1, 40-2 in FIGS. 7 and 8. For example, it is possible to serially connect a resistance or a reactor to each single-phase output of the single-phase voltage source AC/DC converting circuits 40-1, 40-2. Here, in the case that a resistance is connected, it is also possible to serially connect a reactor subsequently to the resistance. Further, it is also possible to connect a single-phase transformer to a single-phase output of the single-phase voltage source AC/DC converting circuits 40-1, 40-2. Here, in the case that a reactor is connected to each single-phase output of the single-phase voltage source AC/DC converting circuits 40-1, 40-2, it is also possible to connect a single-phase transformer subsequently to the reactor. Further, in the case that a resistance is connected to each single-phase output of the single-phase voltage source AC/DC converting circuits 40-1, 40-2 and a reactor is serially connected subsequently to the resistance, it is also possible to connect a single-phase transformer subsequently to the reactor. In this manner, by allowing the single-phase voltage source AC/DC converting circuit 40 to have the internal equivalent impedance, the single-phase voltage source AC/DC converter 11 in FIG. 4 can operate as a voltage source as being connected to a power system.

When the single-phase voltage source AC/DC converting circuit 40 in FIG. 4 is structured as illustrated in FIG. 7 or FIG. 8, the single-phase voltage source AC/DC converter 11 can remove a high frequency component caused by the gate signal at the single-phase voltage source AC/DC converting unit 42 from the output of the single-phase voltage source AC/DC converting unit 42 owing to being provided with the single-phase AC filter circuit 45 (as in FIGS. 7 and 8). Further, since the current or the voltage from the single-phase voltage source AC/DC converting unit 42 is detected at the current detecting circuit 43 or the voltage detecting circuit 44 and the gate signal is generated at the gate signal generator 41 so that the difference between the PWM command and the output from the current detecting circuit 43 or the voltage detecting circuit 44 approaches zero, it is possible to control current errors to be within an allowable range or to control the output voltage to follow the PWM command.

The output voltage detecting circuit 31 in FIG. 4 detects the single-phase AC output voltage at the AC terminal 22 and outputs to the phase difference generating circuit 30, the subordinate voltage control circuit 60, and the superior voltage control circuit 70 respectively. Here, it is also possible that a low pass filter is arranged antecedently to the output voltage detecting circuit 31 to detect the single-phase AC output voltage to the output voltage detecting circuit 31 via the low pass filter. It is possible to stabilize control of the single-phase voltage source AC/DC converter 11 as removing the PWM component from the single-phase AC output voltage. Further, it is also possible that a low pass filter is arranged subsequently to the output voltage detecting circuit 31 to output the output voltage from the output voltage detecting circuit 31 via the low pass filter. It is possible to stabilize control of the single-phase voltage source AC/DC converter 11 as removing the PWM component from the output voltage from the output voltage detecting circuit 31.

An output current detecting circuit 34 in FIG. 4 detects a single-phase AC output current at the AC terminal 22 via a current transformer 38 and outputs to an AC power measuring instrument 140.

Figure 12:
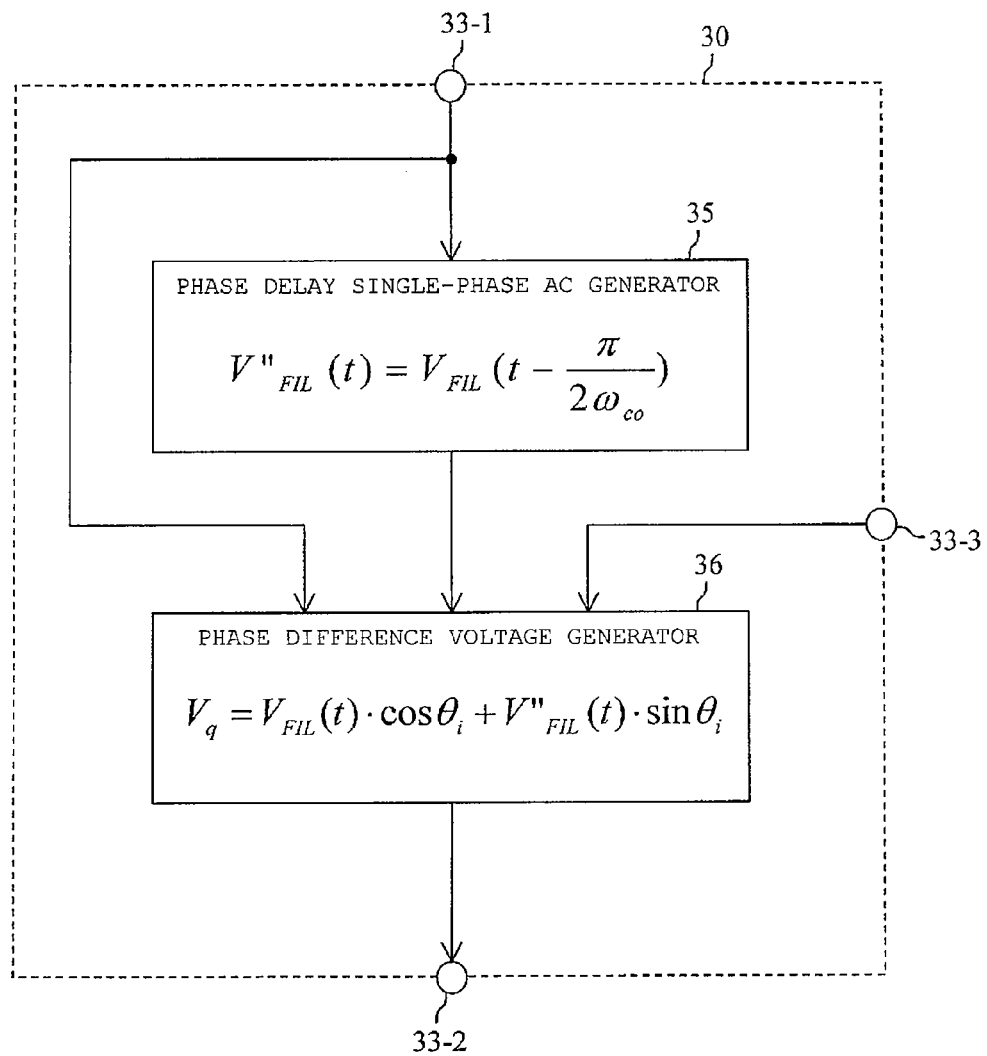
FIG. 12 is a schematic configuration diagram of a phase difference generating circuit included in a single-phase voltage source AC/DC converter according to the present invention.

The phase difference generating circuit 30 in FIG. 4 generates the phase difference voltage corresponding to the phase difference between the single-phase AC output voltage $V_{FIL}$ (t) at the AC terminal 22 and the internal electromotive voltage of the single-phase voltage source AC/DC converting circuit 40. FIG. 12 illustrates an example of a schematic configuration diagram of the phase difference generating circuit 30. The phase difference generating circuit 30 includes a phase delay single-phase AC generator 35 to generate delay single-phase alternating voltage of which specified phase is delayed from single-phase AC voltage input from a terminal 33-1, a phase difference voltage generator 36 to generate the phase difference voltage from the single-phase AC voltage input from the terminal 33-1, a voltage of the delay single-phase alternating voltage from the phase delay single-phase AC generator 35 and a value input from a terminal 33-3, and a terminal 33-2 to output the phase difference voltage. In FIG. 12, the phase delay single-phase AC generator 35 delays the phase of the delay single-phase alternating voltage approximately by 90 degrees. Here, the delayed phase may be any angle as long as not being 0 degree or 180 degrees.

The single-phase AC output voltage $V_{FIL}$ (t) detected by the output voltage detecting circuit 31 is input to the terminal 33-1. A generated electrical angle 57 generated by the later-mentioned frequency control circuit 50 is input to the terminal 33-3. The single-phase AC output voltage $V_{FIL}$(t) at the AC terminal 22 is expressed by Equation 5.

[Equation 5]

$$V_{FIL}(t) = \sqrt{2} E_s \cdot \sin(\omega_s t + \theta_s) \quad [V]$$

Where, $\omega_s$, $\theta_s$, and $E_s$ respectively represent an angular frequency (rad/s), a phase angle (rad), and an effective value (V). A reference of the phase angle is based on the internal electromotive voltage.

In a case that the angular frequency $\omega_s$ of the single-phase AC output voltage at the AC terminal 22 and a reference angular frequency $\omega_{co}$ of the single-phase voltage source AC/DC converting circuit 40 are equal, phase difference between the single-phase AC output voltage $V_{FIL}$(t) and a phase delay single-phase AC voltage $V''_{FIL}$(t) becomes to 90 degrees and the phase delay single-phase AC voltage $V''_{FIL}$(t) to be generated by the phase delay single-phase AC generator 35 is expressed by Equation 6.

$$V''_{FIL}(t) = V_{FIL}\left(t - \frac{\pi}{2\omega_{co}}\right) \quad \text{[Equation 6]}$$
$$= \sqrt{2} E_s \cdot \sin\left(\omega_s t + \theta_s - \frac{\pi \omega_s}{2\omega_{co}}\right)$$
$$= -\sqrt{2} E_s \cdot \cos(\omega_s t + \theta_s)$$

The phase difference voltage generator 36 outputs a phase difference voltage $V_q$(t) from the single-phase AC output voltage $V_{FIL}$(t), the phase delay single-phase AC voltage $V''_{FIL}(t)$, and the generated value generated by the frequency control circuit 50. The phase difference voltage $V_q(t)$ is expressed by Equation 7.

$$V_q(t) = V_{FIL}(t) \cdot \cos\theta_i + V''_{FIL}(t) \cdot \sin\theta_i$$

$$= \sqrt{2}\, E_s \left\{ \sin(\omega_s t + \theta_s - \theta_i) + \frac{\pi(\omega_{co} - \omega_s)}{2\omega_{co}} \sin(\omega_s t + \theta_s)\sin\theta_i \right\}$$

$$= \sqrt{2}\, E_s \cdot \sin(\omega_s t + \theta_s - \theta_i)$$

[Equation 7]

When angular velocity of $\theta_i$ is equal to $\omega_s$, Equation 3 becomes to a constant value. As being phase difference between voltages at both ends of the internal equivalent impedance, $\theta_s$ is small generally. Accordingly, $V_q(t)$ can be approximated as Equation 8.

$$V_q(t) = \sqrt{2} E_s \cdot \theta_s$$  [Equation 8]

The phase difference generating circuit 30 outputs the generated phase difference voltage to the frequency control circuit 50 and the superior voltage control circuit 70 respectively. In the above, only a case that $\omega_s$ and $\omega_{co}$ are equal is described. However, even in a case of being not equal, it is possible to acquire a similar approximate solution and there is no practical problem.

The frequency control circuit 50 determines the electrical angle of the internal electromotive voltage of the single-phase voltage source AC/DC converting circuit 40 based on the reference frequency of the single-phase AC output frequency at the AC terminal 22, the frequency command signal from the superior voltage control circuit 70, and the output signal from the phase difference generating circuit 30. Specifically, as illustrated in FIG. 5, a second adder 56 adds the frequency command signal from the superior voltage control circuit 70 and the phase difference voltage from the phase difference generating circuit 30. A loop filter 53 filters a low range component being a component related to the frequency difference of the single-phase AC output voltage to the frequency component of the signal output by the second adder 56. A low pass element added by the loop filter 53 is a delay element such as a primary delay element, for example. Accordingly, the feedback loop can be stabilized.

Further, a third adder 58 adds the reference frequency output from a reference frequency setting unit 51 and an output value of the loop filter 53. A temporal integrator 55 performs temporal integration to the output from the third adder 58. The generated electrical angle 57 with an inherent angle $\theta_i$ is obtained by the temporal integration on the output from the third adder 58 performed by the temporal integrator 55.

The generated electrical angle 57 becomes to the electrical angle of the internal electromotive voltage of the single-phase voltage source AC/DC converting circuit 40 by a second multiplier 65 of the subordinate voltage control circuit 60. Accordingly, it is possible to allow the rotational angle to follow the frequency of the power system.

Here, the phase difference generating circuit 30 outputs the phase difference voltage corresponding to the phase difference between the single-phase AC output voltage at the AC terminal 22 and the internal electromotive voltage of the single-phase voltage source AC/DC converting circuit 40 as described above. Therefore, the signal process in the phase difference generating circuit 30 is considered to correspond to the phase comparison process to compare the phases of the single-phase AC output voltage and the generated electrical angle 57 from the frequency control circuit 50. Further, the signal process to perform integration after adding the reference frequency from the reference frequency setting unit 51 and the output value from the loop filter 53 is considered to correspond to the signal process of the voltage controlled oscillator (VCO) which varies a value of the generated electrical angle 57 in accordance with the output voltage from the loop filter 53. Therefore, the phase difference generating circuit 30 and the frequency control circuit 50 are considered to perform the operation as the PLL as a whole in which the generated electrical angle 57 is synchronized with frequency of the single-phase AC output voltage at the AC terminal 22.

The first axis voltage command value 120-1 and the second axis voltage command value 120-2 from the later-mentioned power control circuit 150, the generated electrical angle 57 from the frequency control circuit 50, the phase difference voltage from the phase difference generating circuit 30, and the single-phase AC output voltage at the AC terminal 22 are input to the superior voltage control circuit 70 in FIG. 4. Based on the above inputs, the superior voltage control circuit 70 outputs the voltage command signal and the frequency command signal generated so that the amplitude and the frequency of the single-phase AC output voltage at the AC terminal 22 approach the first axis voltage command value 120-1 and the second axis voltage command value 120-2. It is also possible to input the first axis voltage command value 120-1 and the second axis voltage command value 120-2 to the superior voltage control circuit 70 not directly but via a limiter 121 which defines an superior limit and a subordinate limit of the first axis voltage command value 120-1 and the second axis voltage command value 120-2. Specifically, as illustrated in FIG. 5, a first multiplier 73 multiplies a value obtained by multiplying J2 by a sine wave of the generated electrical angle 57 from the frequency control circuit 50 by the first axis voltage command value 120-1. A first subtracter 71a subtracts the AC output voltage at the AC terminal 22 from the signal from the first multiplier 73. A first superior control amplifier 72a amplifies the signal from the first subtracter 71a to output as the voltage command signal so that the single-phase AC output voltage at the AC terminal 22 approaches the first axis voltage command value 120-1. Further, a second subtracter 71b subtracts the phase difference voltage from the phase difference generating circuit 30 from a value obtained by multiplying √2 by the second axis voltage command value 120-2. A second superior control amplifier 72b amplifies the signal from the second subtracter 71b to output as the frequency command signal so that the frequency of the single-phase AC output voltage at the AC terminal 22 approaches the second axis voltage command value 120-2.

Accordingly, even when the amplitude and the frequency of the power system are varied, the respective errors of the amplitude and the frequency of the single-phase output power of the single-phase voltage source AC/DC converter 11 against the amplitude and the frequency can be detected. Here, the first superior control amplifier 72a and the second superior control amplifier 72b may add the low pass element to the output from the first subtracter 71a and the second subtracter 71b. Accordingly, the feedback loop can be stabilized. Further, it is also possible to further provide the limiter subsequently to the first superior control amplifier 72a and the second superior control amplifier 72b and output the outputs from the first superior control amplifier 72a and the second superior control amplifier 72b via the limiter. It is possible to prevent the excessive output to stabilize the control.

The subordinate voltage control circuit 60 in FIG. 4 outputs the signal generated so that the amplitude, the frequency, and the phase of the single-phase AC output voltage approach the synthesized value of the reference voltage of the single-phase AC output voltage at the AC terminal 22, the voltage command signal, and the electrical angle command signal as the PWM command based on the single-phase AC output voltage at the AC terminal 22, the electrical angle command signal including the generated electrical angle 57 of the frequency control circuit 50, and the voltage command signal from the superior voltage control circuit 70. Here, the reference voltage is previously set by a reference voltage setting unit 61. The reference voltage becomes to the reference of the amplitude of the single-phase AC output voltage at the AC terminal 22.

Specifically, as illustrated in FIG. 5, the reference voltage setting unit 61 sets and outputs the reference voltage. The second multiplier 65 multiplies the value obtained by multiplying J2 by the sine value of the generated electrical angle 57 from the frequency control circuit 50 by the reference voltage from the reference voltage setting unit 61. A first adder 62 outputs after adding the voltage command signal from the superior voltage control circuit 70 and the signal output from the second multiplier 65. A third subtracter 63 subtracts the signal from the output voltage detecting circuit 31 from the signal output by the first adder 62. The voltage controller 64 controls the signal output by the third subtracter 63 so that the single-phase AC output voltage at the AC terminal 22 approaches the synthesized value of the reference voltage, the voltage command signal, and the electrical angle command signal to output as the PWM command.

Accordingly, it is possible to compensate the error detected by the superior voltage control circuit 70 and to control the amplitude and the phase of the single-phase voltage source AC/DC converter 11 so that the amplitude and the phase of the single-phase AC output voltage of the single-phase voltage source AC/DC converter 11 is matched with the amplitude and the phase of the power system. For example, an amplifier may be adopted as the voltage controller 64. Here, it is also possible that a low pass filter is further provided between the third subtracter 63 and the voltage controller 64 and that the output from the third subtracter 63 is output via the low pass filter. It is possible to stabilize the control by the voltage controller 64. Further, it is also possible that the voltage limiter is provided between the third subtracter 63 and the voltage controller 64 (when the low pass filter is provided on this position, between the low pass filter and the voltage controller 64) and that the output from the third subtracter 63 is output via the voltage limiter. Transient variation of the output voltage at the time of activation of the single-phase voltage source AC/DC converter 11 can be inhibited.

The AC power measuring instrument 140 in FIG. 4 receives inputs of the value of the single-phase AC output voltage at the AC terminal 22 detected by the output voltage detecting circuit 31 and the value of the single-phase AC output current at the AC terminal 22 detected by the output current detecting circuit 34, and then, calculates a value of active power and a value of reactive power of the single-phase output power at the AC terminal 22.

Figure 9:
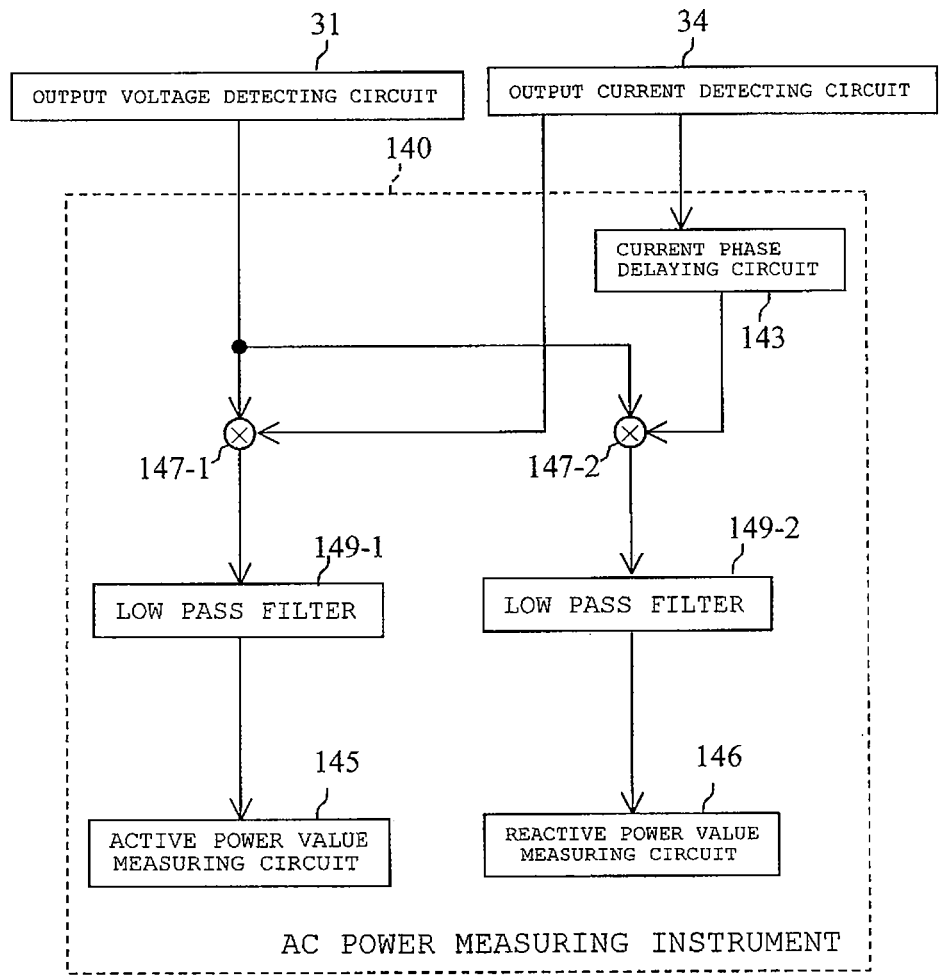
FIG. 9 is a schematic configuration diagram of an AC power measuring instrument included in a single-phase voltage source AC/DC converter according to the present invention.

Specifically, as illustrated in FIG. 9, in the AC power measuring instrument 140, a product of the voltage and the current at a power measuring point measured respectively by the output voltage detecting circuit 31 and the output current detecting circuit 34 multiplied at a multiplier 147-1 is passed through a low pass filter 149-1 and the active power value is measured at an active power value measuring circuit 145. Further, a function of which current phase at the power measuring point is shifted by 90 degrees by a current phase delaying circuit 143 is generated. Then, a product of the function and the voltage at the power measuring point multiplied at a multiplier 147-2 is passed through a low pass filter 149-2 and the reactive power value is measured by a reactive power value measuring circuit 146.

Figure 10:
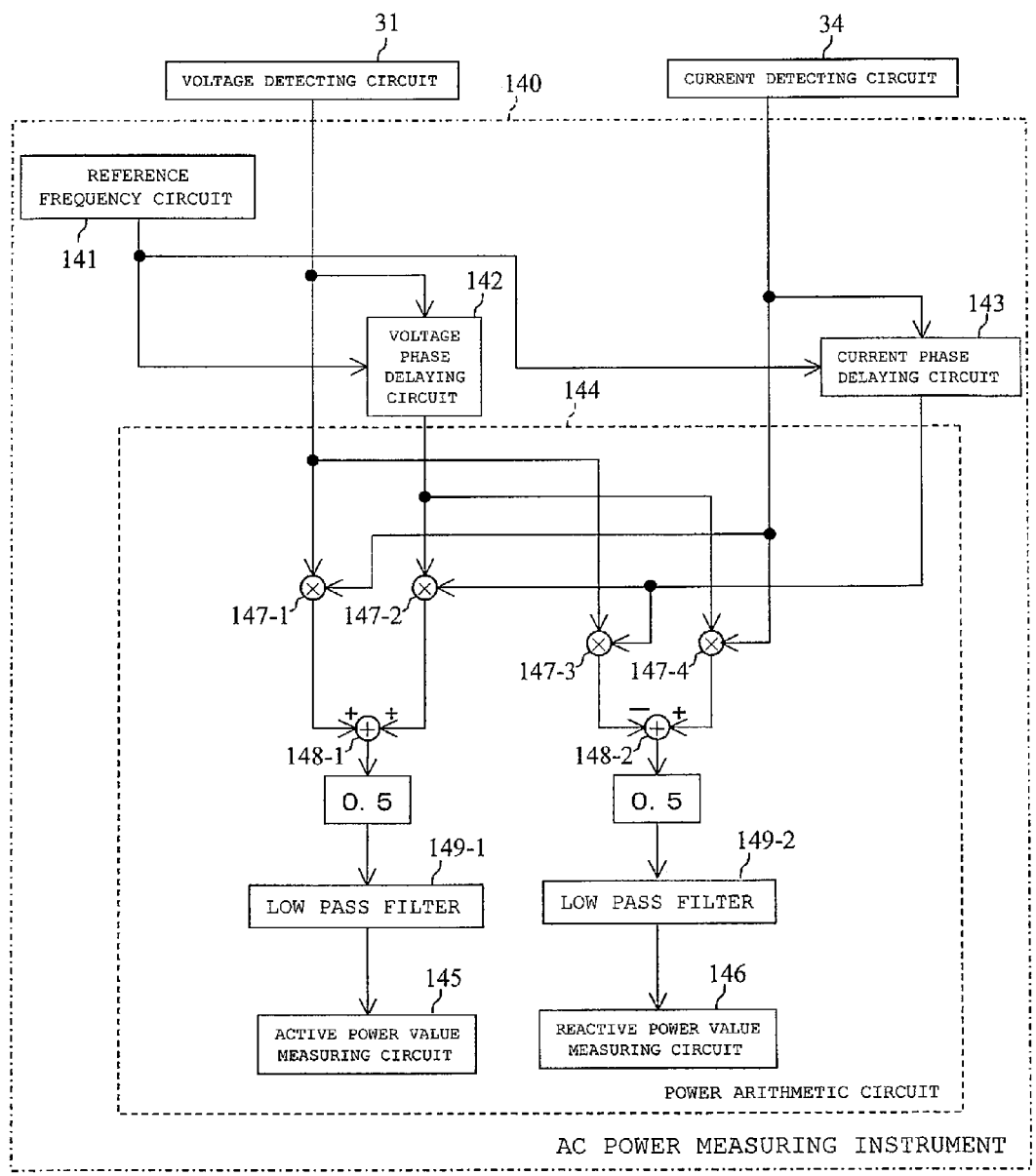
FIG. 10 is a schematic configuration diagram of an AC power measuring instrument included in a single-phase voltage source AC/DC converter according to the present invention.

Alternatively, the AC power measuring instrument 140 may be structured as illustrated in FIG. 10. The AC power measuring instrument 140 includes a reference frequency circuit 141 which generates a reference frequency, a voltage phase delaying circuit 142 which generates a delayed AC voltage as delaying the phase of the measured AC voltage being the AC voltage at the power measuring point based on the reference frequency from the reference frequency circuit 141, a current phase delaying circuit 143 which generates a delayed AC current as delaying the phase of the measured AC current being the AC current at the power measuring point based on the reference frequency from the reference frequency circuit 141, and a power arithmetic circuit 144. In the power arithmetic circuit 144, a product of the measured AC voltage and the measured AC current multiplied at the multiplier 147-1 and a product of the delayed AC voltage from the voltage phase delaying circuit 142 and the delayed AC current from the current phase delaying circuit 143 multiplied at the multiplier 147-2 are added by an adder 148-1. Then, the sum is passed through the low pass filter 149-1 to be measured as the active power value by the active power value measuring circuit 145. Further, a product of the measured AC voltage and the delayed AC current from the current phase delaying circuit 143 multiplied at a multiplier 147-3 is subtracted at a subtracter 148-2 from a product of the measured AC current and the delayed AC voltage from the voltage phase delaying circuit 142 multiplied at a multiplier 147-4. The difference is passed through a low pass filter 149-2 and the reactive power value is measured by the reactive power value measuring circuit 146. By adding the product of the delayed AC voltage and the delayed AC current to the product of the measured AC voltage and the measured AC current, a double frequency component included in the active power value can be decreased. Further, by subtracting the product of the measured AC voltage and the delayed AC current from the product of the measured AC current and the delayed AC voltage, a double frequency component included in the reactive power value can be decreased. Accordingly, the active power value and the reactive power value can be controlled accurately as improving measurement accuracy of the active power value and the reactive power value.

The power control circuit 150 in FIG. 4 receives inputs of the DC voltage command value against the DC voltage at the DC terminal 21, the reactive power command value against the reactive power value of the single-phase output power at the AC terminal 22, the DC voltage detection value at the DC terminal 22 detected by a DC voltage detecting circuit 161, and the reactive power value of the single-phase output power at the AC terminal 22 calculated by the AC power measuring instrument 140. The power control circuit 150 generates and outputs the first axis voltage command value 120-1 against the amplitude of the single-phase output voltage at the AC terminal 22 and the second axis voltage command value 120-2 against the frequency thereof so that the DC voltage at the DC terminal 21 approaches the DC voltage command value and the reactive power value of the single-phase output power at the AC terminal 22 approaches the reactive power command value.

Figure 3:
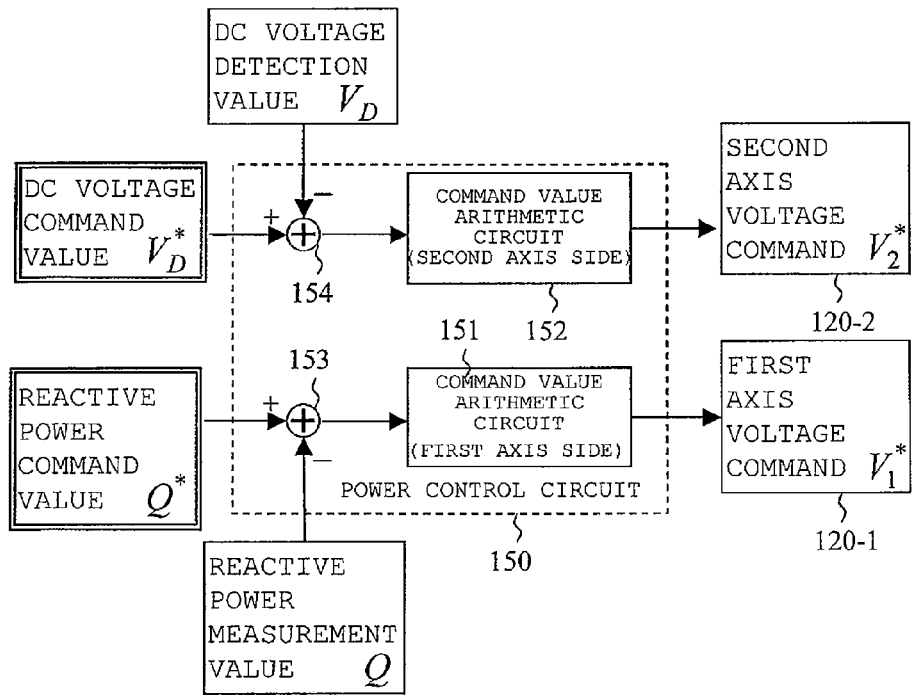
FIG. 3 is a view illustrating concurrent control of a DC voltage and reactive power at a single-phase voltage source AC/DC converter according to the present invention.

FIG. 3 is a block diagram illustrating control details of the power control circuit 150. The power control circuit 150 calculates difference between the reactive power command value and the reactive power value at an adding circuit 153 and outputs the first axis voltage command value as calculating at a command value arithmetic circuit 151. Further, the power control circuit 150 calculates difference between the DC voltage command value and the DC voltage detection value at an adding circuit 154 and outputs the second axis voltage command value as calculating at a command value arithmetic circuit 152.

Figure 13:
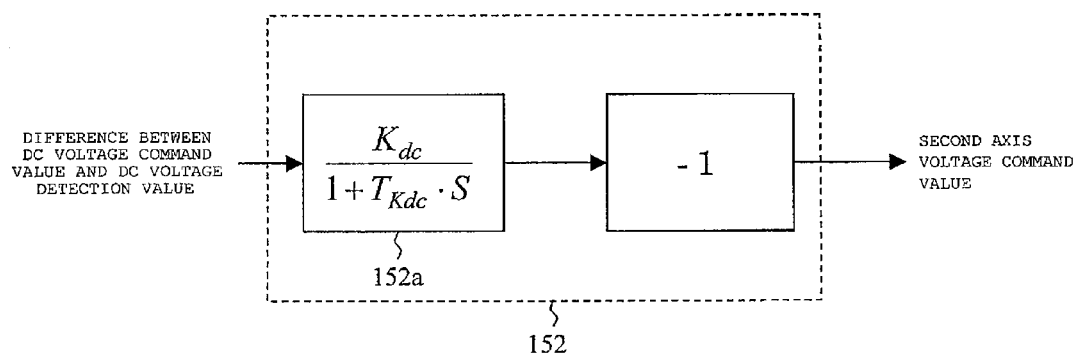
FIG. 13 is a view illustrating a command value arithmetic circuit included in a single-phase voltage source AC/DC converter according to the present invention.
Figure 14:
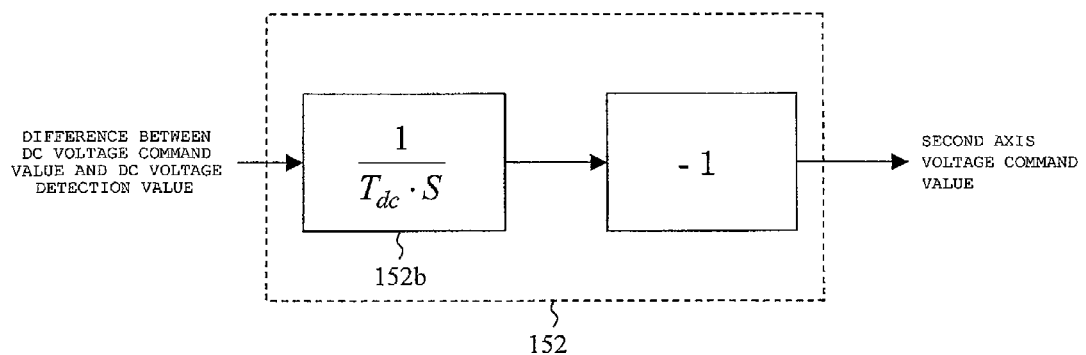
FIG. 14 is a view illustrating a command value arithmetic circuit included in a single-phase voltage source AC/DC converter according to the present invention.
Figure 15:
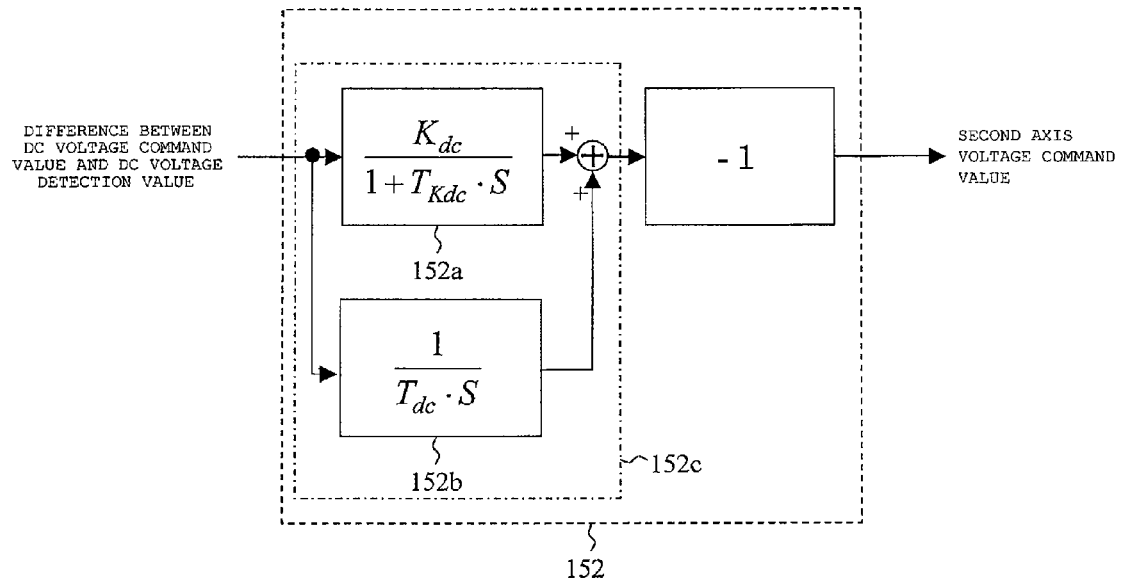
FIG. 15 is a view illustrating a command value arithmetic circuit included in a single-phase voltage source AC/DC converter according to the present invention.

FIGS. 13 to 15 are views illustrating arithmetic at the command value arithmetic circuit 152. The command value arithmetic circuit 152 in FIG. 13 calculates the difference between the DC voltage command value and the DC voltage detection value with a low pass characteristic circuit 152a. The low pass characteristic circuit 152a has characteristics of Equation 1.

[Equation 1]

$$\hat{V}_2^*(s) = -\frac{K_{dc}}{1+T_{Kdc} \cdot s}\left(\hat{V}_D^*(s) - \hat{V}_D(s)\right) \quad (1)$$

where,
$V_2^*$ represents a second axis voltage command;
$V_D^*$ represents a DC voltage command value;
$V_D$ represents a DC voltage detection value;
s represents a variable of laplace transform;.
$K_{dc}$ represents a proportional gain;
$T_{Kdc}$ represents a first-order lag time constant; and
$\hat{}$ represents a laplace transform.

The command value arithmetic circuit 152 in FIG. 14 calculates the difference between the DC voltage command value and the DC voltage detection value with an integrating circuit 152b. The integrating circuit 152b has characteristics of Equation 2.

[Equation 2]

$$\hat{V}_2^*(s) = -\frac{1}{T_{dc} \cdot s}\left(\hat{V}_D^*(s) - \hat{V}_D(s)\right) \quad (2)$$

where,
$V_2^*$ represents a second axis voltage command;
$V_D^*$ represents a DC voltage command value;
$V_D$ represents a DC voltage detection value;
s represents a variable of laplace transform;
$T_{dc}$ represents a integral time constant; and
$\hat{}$ represents a laplace transform.

The command value arithmetic circuit 152 in FIG. 15 calculates the difference between the DC voltage command value and the DC voltage detection value with a parallel circuit 152c in which the low pass characteristic circuit 152a and the integrating circuit 152b are parallely-arranged. The parallel circuit 152c has characteristics of Equation 3.

[Equation 3]

$$\hat{V}_2^*(s) = \left(-\frac{K_{dc}}{1+T_{Kdc} \cdot s} - \frac{1}{T_{dc} \cdot s}\right)\left(\hat{V}_D^*(s) - \hat{V}_D(s)\right) \quad (3)$$

where,
$V_2^*$ represents a second axis voltage command;
$V_D^*$ represents a DC voltage command value;
$V_D$ represents a DC voltage detection value;
s represents a variable of laplace transform;
$K_{dc}$ represents a proportional gain;
$T_{Kdc}$ represents a first-order lag time constant;
$T_{dc}$ represents a integral time constant; and
$\hat{}$ represents a laplace transform.

Meanwhile, the command arithmetic circuit 151 in FIG. 3 calculates the difference between the reactive power command value and the reactive power value with a circuit combining a low pas filter characteristic circuit and an integrating circuit similarly to the command value arithmetic circuit 152 and generates the first axis voltage command value.

For example, when the command value arithmetic circuit 151 and the command value arithmetic circuit 152 are constituted respectively with the circuit in which the low pass filter characteristic circuit and the integrating circuit are parallely-arranged, the first axis voltage command value and the second axis voltage command value are calculated with the following equation.

[Equation 4]

$$\begin{pmatrix}\hat{V}_1^*(s)\\\hat{V}_2^*(s)\end{pmatrix} = \begin{pmatrix}\frac{K_Q}{1+T_{KQ} \cdot s} + \frac{1}{T_Q \cdot s} & 0 \\ 0 & -\frac{K_{dc}}{1+T_{Kdc} \cdot s} - \frac{1}{T_{dc} \cdot s}\end{pmatrix}\begin{pmatrix}\hat{Q}^*(s) - \hat{Q}(s)\\\hat{V}_D^*(s) - \hat{V}_D(s)\end{pmatrix} \quad (4)$$

where,
$V_1^*$ represents a first axis voltage command (V);
$V_2^*$ represents a second axis voltage command (V);
$Q^*$ represents a reactive power command (var);
Q represents a reactive power value (var);
$V_D^*$ represents a DC voltage command value (V);
$V_D$ represents a DC voltage detection value (V);
$K_Q$ represents a first-lag gain of Q control;
$T_{KQ}$ represents a first-order lag time constant (s) of Q control;
$T_Q$ represents a integral time constant (s) of Q control;
$K_{dc}$ represents a first-lag gain of DC voltage control;
$T_{Kdc}$ represents a first-order lag time constant (s) of DC voltage control;
$T_{dc}$ represents a integral time constant (s) of DC voltage control; and
$\hat{}$ represents a laplace transform.

The single-phase voltage source AC/DC converter 11 operates as follows. When DC power is input from the DC terminal 21 side, the DC voltage detection value $V_D$ is increased. Since the error between the DC voltage detection value and the DC voltage command value $V_D^*$ becomes negative, the command value arithmetic circuit 152 operates so as to increase the second axis voltage command $V_2^*$. When the DC voltage command value $V_D^*$ is increased, the error against the DC voltage detection value becomes positive. Accordingly, the command value arithmetic circuit 152 operates so as to decrease the second axis voltage command $V_2^*$. In the command value arithmetic circuit 152 at the second axis voltage command $V_2^*$ side, the polarity of output against input is inverted. Meanwhile, relation between the first axis voltage command $V_1^*$ and the reactive power value is the same as in a case of PQ control. Accordingly, there is no inversion between input and output in the command value arithmetic circuit 151 at the first axis voltage command $V_1^*$ side.

Figure 16:
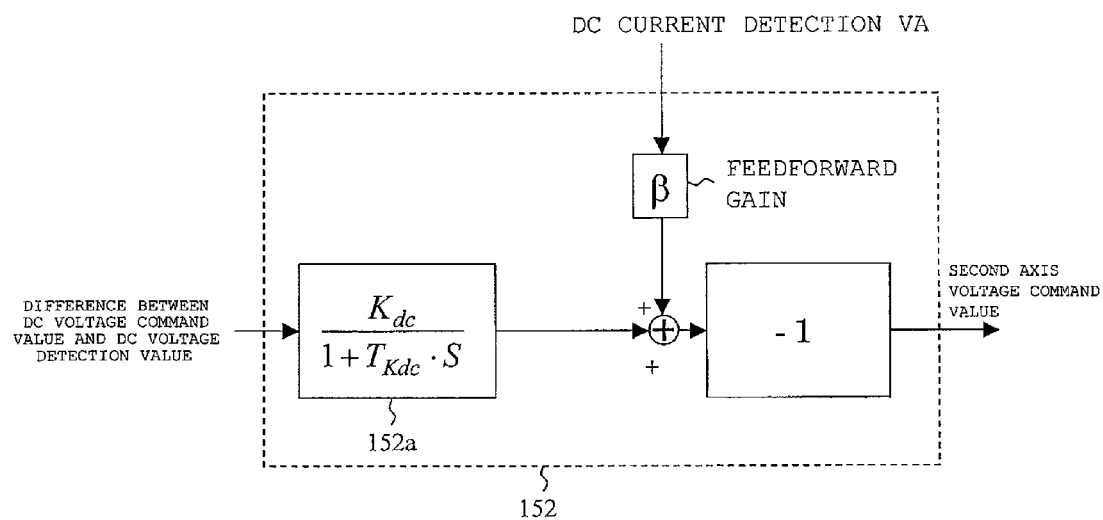
FIG. 16 is a view illustrating a command value arithmetic circuit included in a single-phase voltage source AC/DC converter according to the present invention.
Figure 17:
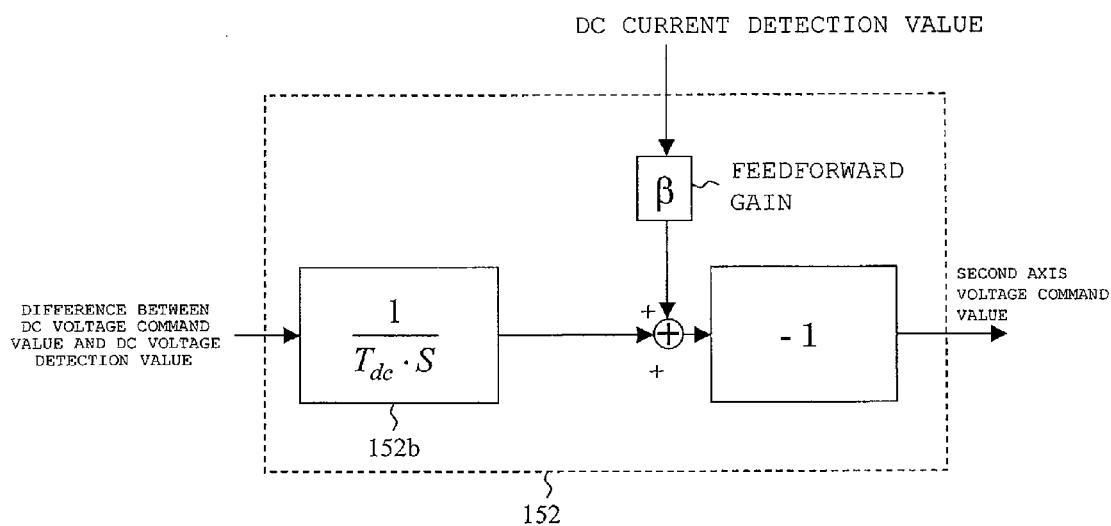
FIG. 17 is a view illustrating a command value arithmetic circuit included in a single-phase voltage source AC/DC converter according to the present invention.
Figure 18:
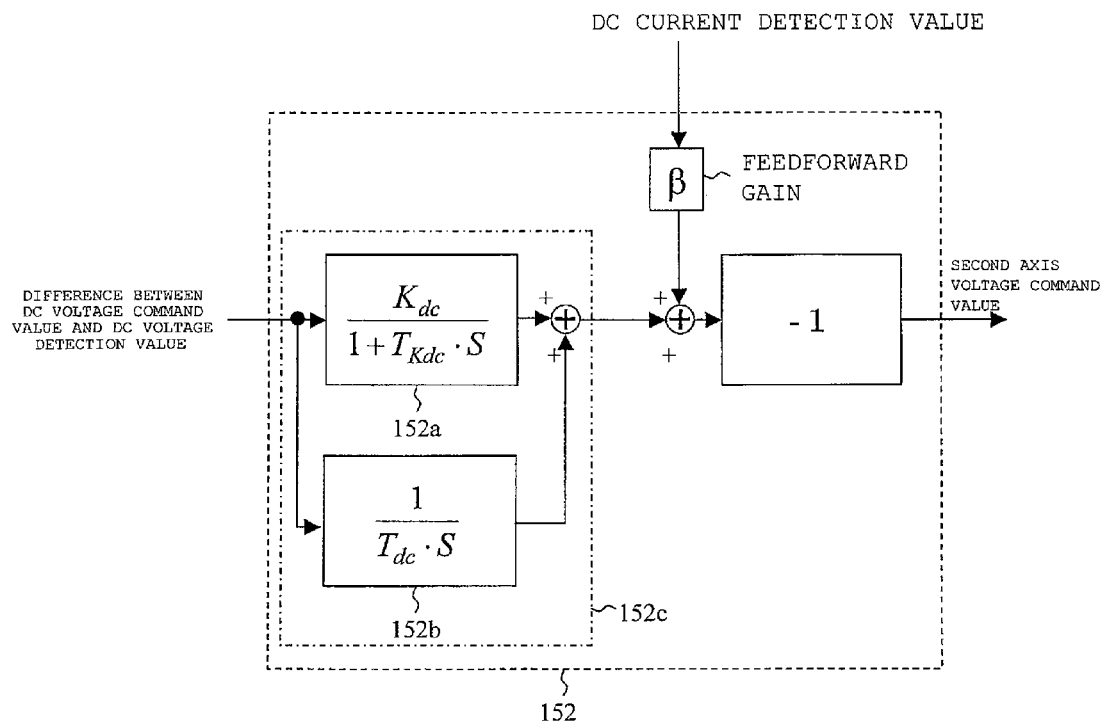
FIG. 18 is a view illustrating a command value arithmetic circuit included in a single-phase voltage source AC/DC converter according to the present invention.

The single-phase voltage source AC/DC converter 11 further includes a DC current detecting circuit 162 which detects the DC current value at the DC terminal 21. The command value arithmetic circuit 152 of the power control circuit 150 adds the DC current value detected by the DC current detecting circuit 162 to the difference between the DC voltage command value and the DC voltage detection value after the difference is calculated by the low pass characteristic circuit 152a, the integrating circuit 152b, or the parallel circuit 152c. FIGS. 16 to 18 are views illustrating arithmetic at the command value arithmetic circuit 152 in a case of adding the DC current value.

Figure 6:
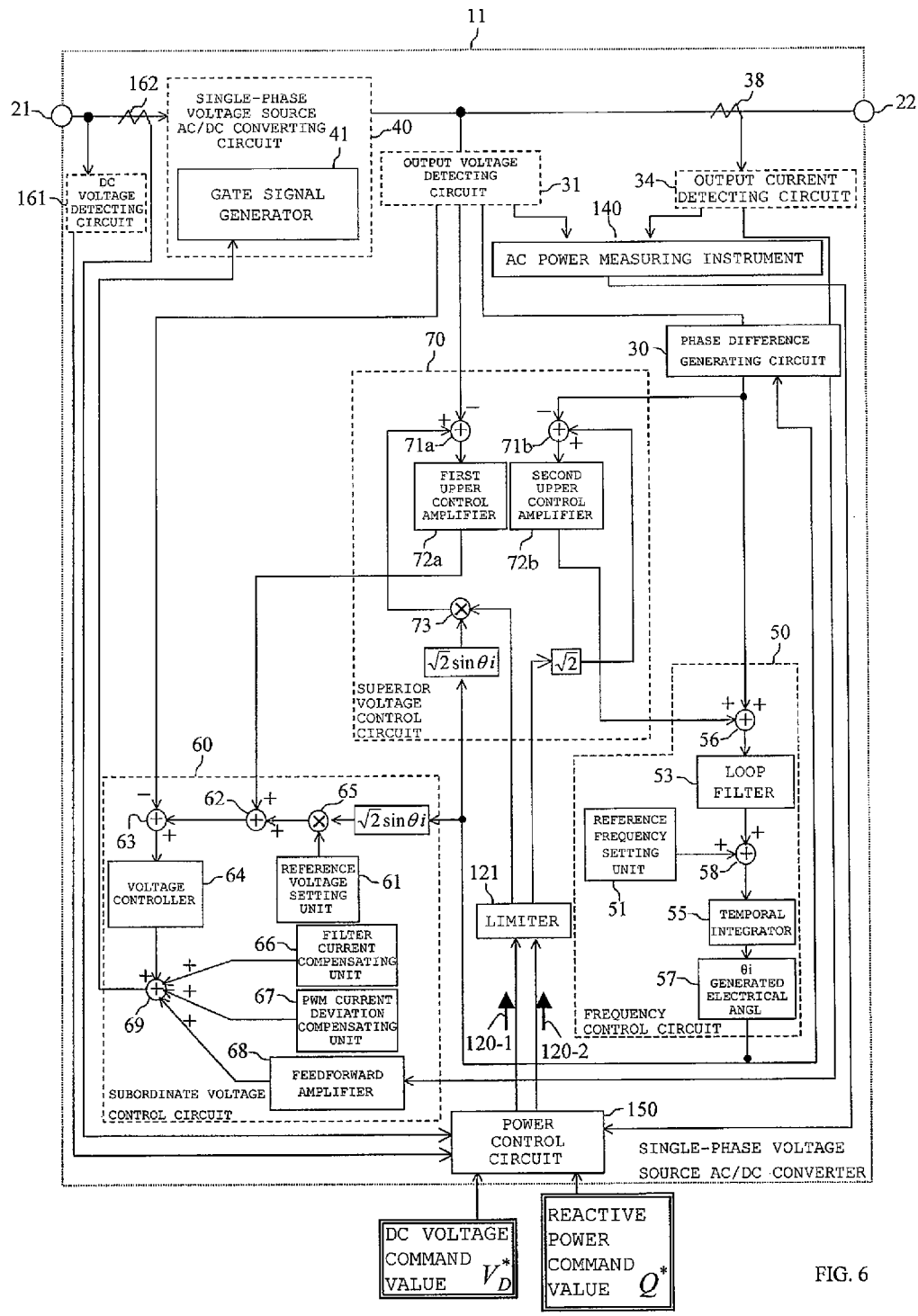
FIG. 6 is a schematic configuration diagram of a single-phase voltage source AC/DC converter according to the present invention.

FIG. 6 illustrates a schematic configuration diagram of a single-phase voltage source AC/DC converter according to another embodiment.

The single-phase voltage source AC/DC converter 11 of the present embodiment in FIG. 6 includes a fourth adder 69 which further adds outputs from a filter current compensating unit 66, a PWM current deviation compensating unit 67, and a feedforward amplifier 68 to the output of the voltage controller 64 of the single-phase voltage source AC/DC converter 11 in FIG. 5. In this case, any of the single-phase voltage source AC/DC converting circuits 40-1, 40-2 illustrated in FIGS. 7 and 8 may be adopted as the single-phase voltage source AC/DC converting circuit 40. Therefore, it is assumed that either of the single-phase voltage source AC/DC converting circuits 40-1, 40-2 illustrated in FIGS. 7 and 8 is adopted in FIG. 6.

The filter current compensating unit 66 outputs a current compensation value defined so as to compensate the current loss in the single-phase AC filter circuit 45 (FIGS. 7 and 8) in the single-phase voltage source AC/DC converting circuit 40. Accordingly, the single-phase voltage source AC/DC converter 11 can compensate the current loss by setting the current loss at the single-phase AC filter circuit 45 in FIG. 7 or FIG. 8 previously in the filter current compensating unit 66 and adding to the output vector from the voltage controller 64. Further, the PWM current deviation compensating unit 67 outputs a current deviation compensation value defined to compensate the current deviation of the single-phase AC output current from the single-phase voltage source AC/DC converting circuit 40. Accordingly, the single-phase voltage source AC/DC converter 11 can compensate the current deviation by setting the current deviation at the single-phase voltage source AC/DC converting circuit 40 when the PWM command is set to zero command previously in the PWM current deviation compensating unit 67 and adding to the output vector from the voltage controller 64. Further, the feedforward amplifier 68 outputs as amplifying with a predetermined feedforward gain so that the value of the single-phase AC output current detected by the output current detecting circuit 34 is input to compensate the current for the load at the AC terminal 22. Accordingly, the single-phase voltage source AC/DC converter 11 can generate the stable output voltage even when the load current is varied by detecting the single-phase AC output current at the AC terminal 22 by the output current detecting circuit 34 and adding the value to the output value from the voltage controller 64 via the feedforward amplifier 68.

The limiter 121 determines the superior limit and the subordinate limit of the first axis voltage command value 120-1 and the second axis voltage command value 120-2 to prevent the first axis voltage command value 120-1 and the second axis voltage command value 120-2 from being excessively input to the superior voltage control circuit 70.

As described above, the single-phase voltage source AC/DC converter 11 in FIGS. 4 to 6 is capable of performing autonomous parallel operation as autonomously compensating the power deviation against the power system owing to including the frequency control circuit 50, the superior voltage control circuit 70, and the subordinate voltage control circuit 60, while being capable of performing operation as being connected to the power system as the voltage source owing to having the internal equivalent impedance. Accordingly, reliability of the device is improved and dispersed arrangement can be adopted. In addition, in a case of parallel operation with a plurality of devices, it is possible to perform the operation without limitation in the number of the devices.

Further, since the power control circuit 150 includes the command value arithmetic circuit 152 and the second axis voltage command is generated in accordance with the DC voltage detection value, the single-phase voltage source AC/DC converter 11 can maintain the DC voltage at the DC terminal 21 at constant. Accordingly, the single-phase source AC/DC converter 11 is capable of performing autonomous parallel operation while being capable of connecting a DC device of which outputting or requiring DC power fluctuates to the DC terminal 21.

[Interconnection System]

Figure 19:
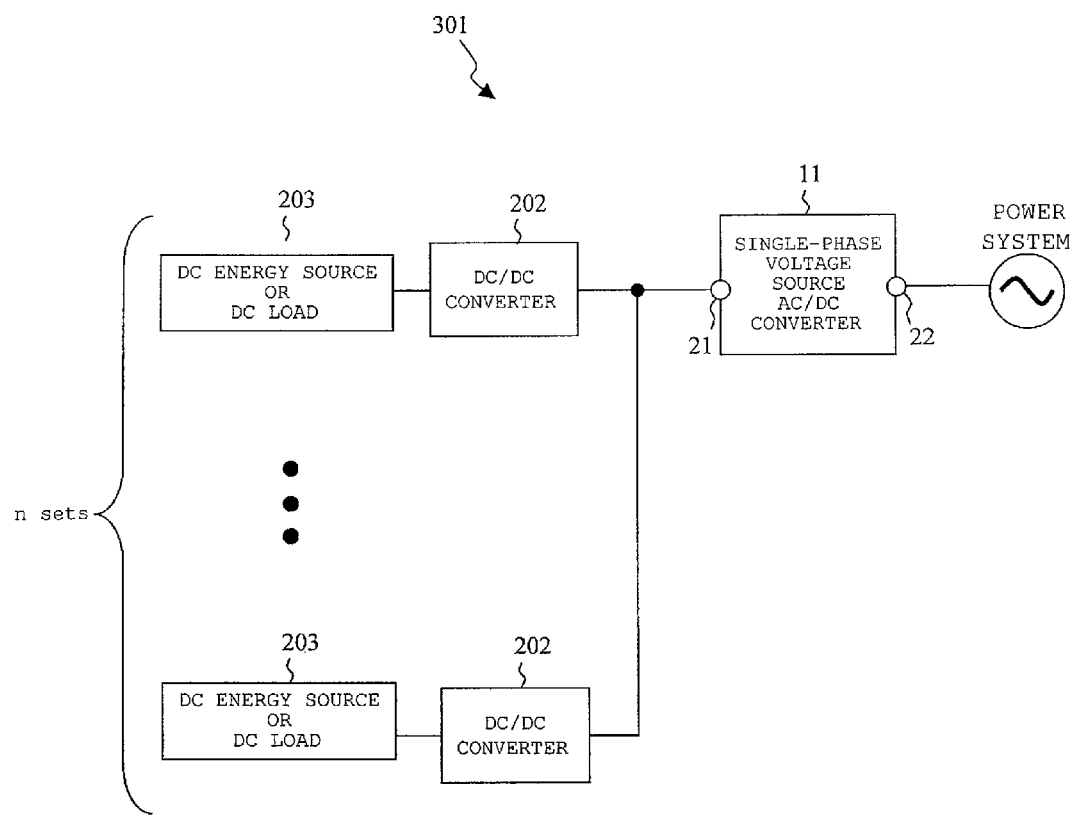
FIG. 19 is a view illustrating a configuration of an interconnection system according to the present invention.

Next, an interconnection system 301 including the single-phase voltage source AC/DC converter 11 illustrated in FIGS. 4 to 6 is described. FIG. 19 is a view illustrating a configuration of the interconnection system 301. The interconnection system 301 includes the single-phase voltage source AC/DC converter 11 and n (n is any positive integer) sets of DC devices 203 which are connected to the DC terminal 21 of the single-phase voltage source AC/DC converter 11 via a DC/DC converters 202 and which performs transmitting and receiving of DC power with the DC terminal 21.

The DC/DC converter 202 is a DC converter of a current output type. For example, when the DC device 203 is a solar cell, the DC/DC converter 202 adjusts a voltage and a current so as to obtain the maximum power from the solar cell.

The DC device 203 is a DC energy source or a DC load. The DC energy source denotes a solar cell, a secondary cell, a fuel battery and the like, for example. The DC load denotes a battery charger, for example. In the interconnection system 301, since the single-phase voltage source AC/DC converter 11 can maintain the DC voltage at the DC terminal 21 at constant, the DC device 203 can be connected directly to the DC terminal 21 via the DC/DC converter 202.

Here, in addition to transmitting and receiving of power between the DC device 203 and the power system, it is also possible that DC power is directly supplied to the DC device 203 being the DC load from the DC device 203 being the DC energy source in the interconnection system 301. Since the single-phase voltage source AC/DC converter 11 operates so as to maintain the DC voltage at the DC terminal 21 at a constant value even when the DC voltage from the DC energy source fluctuates, the DC load can receive power at a constant voltage.

Example

Figure 20:
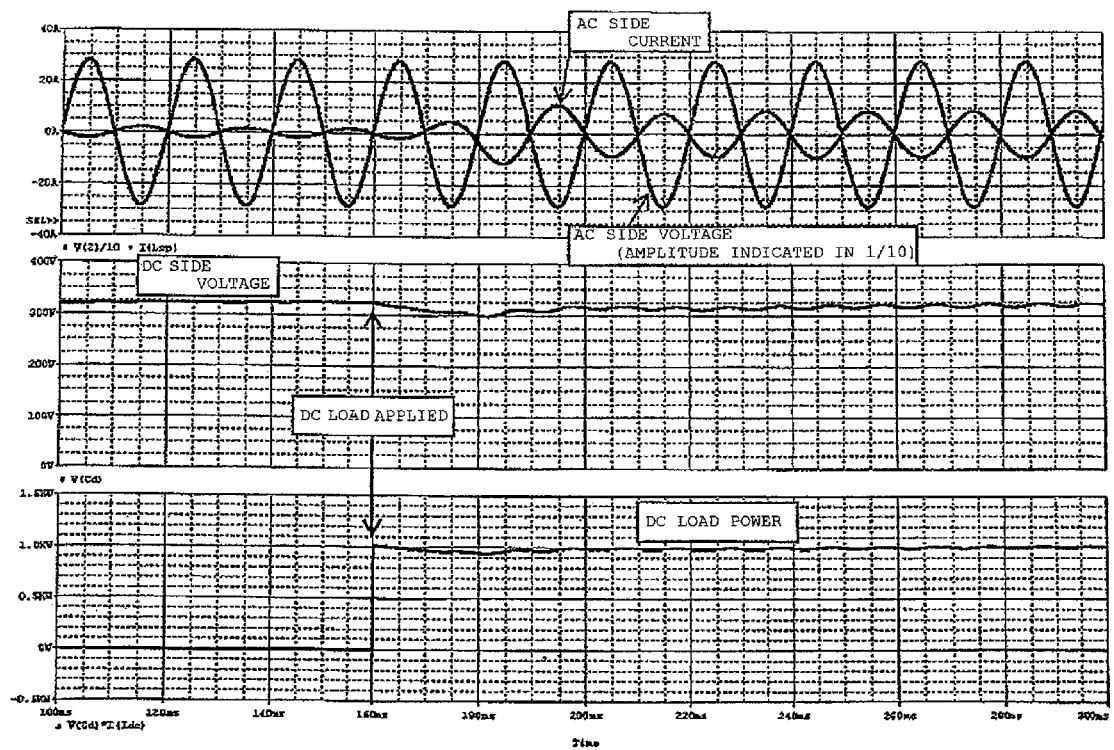
FIG. 20 is a simulation result with a single-phase voltage source AC/DC converter according to the present invention.

FIG. 20 shows a simulation result with a single-phase voltage source AC/DC converter at 200 V, 50 Hz, and 1 kVA.

The single-phase voltage source AC/DC converter includes the circuit in FIG. 4 as the command value arithmetic circuit in the power control circuit. Then, the DC voltage command value to be input to the power control circuit is set to 330 V. Control parameters are set as "$K_{dc}=0.6$, $T_{dc}=2$ ms, and $T_{Kdc}=0.25$ sec". Interconnection operation was performed in a state of no load at the DC side in the beginning, and then, 1 kW of step-shaped DC load was applied at time 160 ms. The DC voltage at the DC terminal 21 was decreased by 30 V after the load was applied. However, power immediately inflew from the AC terminal 22 side via the single-phase voltage source AC/DC converting circuit 40, so that the DC voltage returned approximately to the DC voltage command value at time 200 ms. Here, the receiving current waveform from the power system formed a sine wave as the power factor being 1.

The single-phase voltage source AC/DC converter of the present invention can be applied for an inverter for a dispersed power source such as a solar power generation inverter, a fuel cell inverter, a storage system inverter and a wind power generation inverter with a DC link, a rectifier, a static var compensator (SVC), and the like.

DESCRIPTION OF REFERENCE NUMERALS

| | |
|---|---|
| 11: | single-phase voltage source AC/DC converter |
| 21: | DC terminal |
| 22: | AC terminal |
| 30: | phase difference generating circuit |
| 31: | output voltage detecting circuit |
| 33-1~33-3: | terminal |
| 34: | output current detecting circuit |
| 35: | phase delay single-phase AC generator |
| 36: | phase difference voltage generator |
| 38: | current transformer |
| 40: | single-phase voltage source AC/DC converting circuit |
| 40-1, 40-2: | single-phase voltage source AC/DC converting circuit |
| 41: | gate signal generator |
| 42: | single-phase voltage source AC/DC converting unit |
| 43: | current detecting circuit |
| 44: | voltage detecting circuit |
| 45: | single-phase AC filter circuit |
| 50: | frequency control circuit |
| 51: | reference frequency setting unit |
| 53: | loop filter |
| 55: | temporal integrator |
| 56: | second adder |
| 57: | generated electrical angle |
| 58: | third adder |
| 60: | subordinate voltage control circuit |
| 61: | reference voltage setting unit |
| 62: | first adder |
| 63: | third subtracter |
| 64: | voltage controller |
| 65: | second multiplier |
| 66: | filter current compensating unit |
| 67: | PWM current deviation compensating unit |
| 68: | feedforward amplifier |
| 69: | fourth adder |
| 70: | superior voltage control circuit |
| 71a: | first subtracter |
| 71b: | second subtracter |
| 72a: | first superior control amplifier |
| 72b: | second superior control amplifier |
| 73: | first multiplier |
| 120-1: | first axis voltage command value |
| 120-2: | second axis voltage command value |
| 121: | limiter |
| 140: | AC power measuring instrument |
| 141: | reference frequency circuit |
| 142: | voltage phase delaying circuit |
| 143: | current phase delaying circuit |
| 144: | power arithmetic circuit |
| 145: | active power value measuring circuit |
| 146: | reactive power value measuring circuit |
| 147-1, 147-2, 147-3, 147-4: | multiplier |
| 148-1: | adder |
| 148-2: | subtracter |
| 149-1, 149-2: | low pass filter |
| 150: | power control circuit |
| 151: | command value arithmetic circuit |
| 152: | command value arithmetic circuit |
| 152a: | low pass characteristic circuit |
| 152b: | integrating circuit |
| 152c: | parallel circuit |
| 153: | adding circuit |
| 154: | adding circuit |
| 161: | DC voltage detecting circuit |
| 162: | DC current detecting circuit |
| 202: | DC/DC converter |
| 203: | DC device |
| 301: | inter connection system |
| B1: | superior command vector |
| B2: | superior control block |
| B3: | ac-AVR block |
| B4: | ETM-PWM block |
| B5: | main switch |

What is claimed is:

1. A single-phase voltage source AC/DC converter, comprising:

a single-phase voltage source AC/DC converting circuit which has internal equivalent impedance as seen from an AC terminal, for converting power from a DC voltage source connected to a DC terminal to single-phase AC power to output from the AC terminal or for converting single-phase AC power from a single-phase AC source connected to the AC terminal to DC power to output from the DC terminal in accordance with a pulse width of a gate signal generated based on a PWM command;

a phase difference generating circuit, which has a phase delay single-phase AC generator for delaying a phase of a single-phase AC output voltage at the AC terminal and generating a delay single-phase alternating voltage, for generating a phase difference voltage corresponding to phase difference between the single-phase AC output voltage at the AC terminal and an internal electromotive voltage of the single-phase voltage source AC/DC converting circuit based on the delay single-phase alternating voltage;

a superior voltage control circuit to which a first axis voltage command for amplitude of the single-phase AC output voltage at the AC terminal and a second axis voltage command for a single-phase AC frequency at the AC terminal are input for outputting a voltage command signal generated so that the amplitude of the single-phase AC output voltage at the AC terminal approaches the first axis voltage command and a frequency command signal generated so that the single-phase AC frequency at the AC terminal approaches the second axis voltage command based on the first axis voltage command, the second axis voltage command, the phase difference voltage from the phase difference generating circuit and the single-phase AC output voltage at the AC terminal;

a frequency control circuit for determining an electrical angle of the internal electromotive voltage of the single-phase voltage source AC/DC converting circuit to generate a generated electrical angle based on a reference frequency of a single-phase AC output frequency at the AC terminal, the frequency command signal from the superior voltage control circuit, and an output signal from the phase difference generating circuit;

a subordinate voltage control circuit for outputting a signal generated so that the amplitude, the frequency, and the phase of the single-phase AC output voltage approach a synthesized value of a reference voltage of the single-phase AC output voltage at the AC terminal, the voltage command signal, and the generated electrical angle as the PWM command based on the single-phase AC output voltage at the AC terminal, the generated electrical angle of the frequency control circuit, and the voltage command signal from the superior voltage control circuit; and a command value arithmetic circuit to which a DC voltage command value to specify a voltage at the DC terminal is set and which obtains the second axis voltage command by detecting a DC voltage detection value being the voltage at the DC terminal and calculating difference between the DC voltage command value and the DC voltage detection value.

2. The single-phase voltage source AC/DC converter according to claim 1, wherein the command value arithmetic circuit calculates the difference between the DC voltage command value and the DC voltage detection value with a low pass characteristic circuit.

3. The single-phase voltage source AC/DC converter according to claim 2,
wherein the low pass characteristic circuit of the command value arithmetic circuit has characteristics of Equation 1

[Equation 1]

$$\hat{V}_2^*(s) = -\frac{K_{dc}}{1+T_{Kdc} \cdot s}\left(\hat{V}_D^*(s) - \hat{V}_D(s)\right) \quad (1)$$

where,
$V_2^*$ represents a second axis voltage command;
$V_D^*$ represents a DC voltage command value;
$V_D$ represents a DC voltage detection value;
s represents a variable of laplace transform;
$K_{dc}$ represents a proportional gain;
$T_{Kdc}$ represents a first-order lag time constant; and
$\hat{}$ represents a laplace transform.

4. The single-phase voltage source AC/DC converter according to claim 1,
wherein the command value arithmetic circuit calculates the difference between the DC voltage command value and the DC voltage detection value with an integrating circuit.

5. The single-phase voltage source AC/DC converter according to claim 4,
wherein the integrating circuit of the command value arithmetic circuit has characteristics of Equation 2

[Equation 2]

$$\hat{V}_2^*(s) = -\frac{1}{T_{dc} \cdot s}\left(\hat{V}_D^*(s) - \hat{V}_D(s)\right) \quad (2)$$

where,
$V_2^*$ represents a second axis voltage command;
$V_D^*$ represents a DC voltage command value;
$V_D$ represents a DC voltage detection value;
s represents a variable of laplace transform;
$T_{dc}$ represents a integral time constant; and
$\hat{}$ represents a laplace transform.

6. The single-phase voltage source AC/DC converter according to claim 1, wherein the command value arithmetic circuit calculates the difference between the DC voltage command value and the DC voltage detection value with a parallel circuit in which a low pass characteristic circuit and an integrating circuit are parallely-arranged.

7. The single-phase voltage source AC/DC converter according to claim 6,
wherein the parallel circuit of the command value arithmetic circuit has characteristics of Equation 3

[Equation 3]

$$\hat{V}_2^*(s) = \left(-\frac{K_{dc}}{1+T_{Kdc} \cdot s} - \frac{1}{T_{dc} \cdot s}\right)\left(\hat{V}_D^*(s) - \hat{V}_D(s)\right) \quad (3)$$

where,
$V_2^*$ represents a second axis voltage command;
$V_D^*$ represents a DC voltage command value;
$V_D$ represents a DC voltage detection value;
s represents a variable of laplace transform;
$K_{dc}$ represents a proportional gain;
$T_{Kdc}$ represents a first-order lag time constant;
$T_{dc}$ represents a integral time constant; and
$\hat{}$ represents a laplace transform.

8. The single-phase voltage source AC/DC converter according to claim 1, further comprising a DC current detecting circuit for detecting a DC current value at the DC terminal,
wherein the command value arithmetic circuit adds the DC current value detected by the DC current detecting circuit when calculating the difference between the DC voltage command value and the DC voltage detection value.

9. An interconnection system comprising:
the single-phase voltage source AC/DC converter according to claim 1; and
n (n is any positive integer) sets of DC devices which are connected to the DC terminal of the single-phase voltage source AC/DC converter via a DC/DC converters so that DC power is transmitted to and received from the DC terminal.

* * * * *